United States Patent
Kim et al.

(10) Patent No.: US 12,297,213 B2
(45) Date of Patent: May 13, 2025

(54) METAL HYDROXIDE COMPLEX COMPRISING MODIFIED MULTILAYER HYDROXIDE STRUCTURE COMPRISING ACTIVE INGREDIENT AND METHOD OF MANUFACTURING SAME

(71) Applicants: CNPHARM CO., LTD., Seoul (KR); HYUNDAI BIOSCIENCE CO., LTD., Gyeongsangbuk-do (KR)

(72) Inventors: Ho-Jun Kim, Seoul (KR); Ki-Yeok Kim, Seoul (KR)

(73) Assignees: CNPHARM CO., LTD., Seoul (KR); HYUNDAI BIOSCIENCE CO., LTD., Gyeongsangbuk-do (KR)

( * ) Notice: Subject to any disclaimer, the term of this patent is extended or adjusted under 35 U.S.C. 154(b) by 903 days.

(21) Appl. No.: 16/969,710

(22) PCT Filed: Sep. 23, 2019

(86) PCT No.: PCT/KR2019/012331
§ 371 (c)(1),
(2) Date: Feb. 26, 2021

(87) PCT Pub. No.: WO2020/075987
PCT Pub. Date: Apr. 16, 2020

(65) Prior Publication Data
US 2023/0192726 A1    Jun. 22, 2023

(30) Foreign Application Priority Data
Oct. 8, 2018  (KR) .................. 10-2018-0120027

(51) Int. Cl.
C07F 3/06    (2006.01)
A61K 8/02    (2006.01)

(52) U.S. Cl.
CPC .................. C07F 3/06 (2013.01)

(58) Field of Classification Search
CPC ..... C07F 3/06; C07F 3/04; C07F 3/02; A61K 8/0258; A61K 2800/58
See application file for complete search history.

(56) References Cited

U.S. PATENT DOCUMENTS

2004/0171735 A1    9/2004    Choy et al.

FOREIGN PATENT DOCUMENTS

| CN | 1535131 A | 10/2004 |
|---|---|---|
| JP | 2004-091421 A | 3/2004 |
| JP | 2004-538296 A | 12/2004 |
| JP | 2017-114747 A | 6/2017 |
| KR | 10-2003-0012641 A | 2/2003 |
| KR | 20030012641 A | 2/2003 |
| KR | 20060125280 A | 12/2006 |
| KR | 2010008656 A | 2/2010 |
| KR | 100998354 B1 | 12/2010 |
| KR | 101082391 B1 | 11/2011 |
| KR | 10-2017-0064466 A | 6/2017 |
| KR | 10-1883791 B1 | 7/2018 |
| RU | 2420297 C2 | 6/2011 |
| WO | 2015090857 A1 | 6/2015 |
| WO | 2017/095055 A1 | 6/2017 |

OTHER PUBLICATIONS

N. Masciocchi, et al. 131(2) Journal of Solid State Chemistry 252-262 (1997) (Year: 1997).*
J-H. Choy, et.al. 12.Supplement 1 Clay science 52-56 (2005) (Year: 2005).*
H. Nabipour, et.al. 29 Journal of Porous Materials 341-356 (2022) (Year: 2022).*
S. Neman et al., 148 Journal of Solid State Chemistry, 26-40 (1999) (Year: 1999).*
N. Allou et al., 295 Colloid Polym. Sci., 725-747 (2017) (Year: 2017).*
I Nangoi, 107 Applied Clay Science, 131-137 (2015) (Year: 2015).*
Solid State Characterization of Pharmaceuticals 63 (R.A. Storey et al., eds., 2011) (Year: 2011).*
"Synthesis, spectroscopic studies and in vitro antibacterial activity of Ibuprofen and its derived metal complexes", Inorganic Chemistry Communications, vol. 45, Jul. 1, 2014 (Jul. 1, 2014), pp. 61-65, DOI:10.1016/j.inoche.2014.03.039.
JP Patent Office. "Notice of Reasons for Rejection." JP Patent Application No. 2020-544662. Mailed: Jul. 11, 2023. 14 pages.
China National Intellectual Property Administration. "Notification of the Second Office Action." CN Patent Application No. 201980024676. 5. Mailed: Jul. 12, 2023. 7 pages.
International Search Report and Written Opinion for related International Application No. PCT/KR2019/012331, mailed on Dec. 27, 2019; English translation of ISR provided (10 pages).
Examination Report for AU App No. 2019356373, dated Jul. 9, 2024, 3 pgs.
Allowance Notice for JP App No. 2020-544662, dated Oct. 8, 2024, 2 pgs.

* cited by examiner

Primary Examiner — Alexander R Pagano
Assistant Examiner — Frank S. Hou
(74) Attorney, Agent, or Firm — Procopio, Cory, Hargreaves & Savitch LLP

(57) ABSTRACT

The present invention relates to a metal hydroxide complex including the multilayer hydroxide structure of Chemical Formula 1, including a base layer, a surface layer and an active ingredient, a metal hydroxide complex manufactured by subjecting an active ingredient and a metal hydroxide structure precursor to coprecipitation through a precipitation reaction using an alcohol and water, and a method of manufacturing the same.

13 Claims, 16 Drawing Sheets

Specification includes a Sequence Listing.

[1a] $Zn(OH)_2(c) \rightleftharpoons Zn(OH)^+(aq) + OH^-(aq)$
[1b] $K_1 = [Zn(OH)^+][OH^-]$
[2a] $Zn(OH)_2(c) \rightleftharpoons Zn(OH)_2(aq)$
[2b] $K_2 = [Zn(OH)_2]$
[3a] $Zn(OH)_2(c) + OH^-(aq) \rightleftharpoons Zn(OH)_3^-(aq)$
[3b] $K_3 = [Zn(OH)_3^-]/[OH^-]$
[4a] $Zn(OH)_2(c) + 2OH^-(aq) \rightleftharpoons Zn(OH)_4^{2-}(aq)$
[4b] $K_4 = [Zn(OH)_4^{2-}]/[OH^-]^2$
[5a] $Zn(OH)_2(c) \rightleftharpoons Zn^{2+}(aq) + 2OH^-(aq)$
[5b] $K_{sp} = [Zn^{2+}][OH^-]^2$

| 12.5 °C | | 25 °C | | 50 °C | | 75 °C | |
|---|---|---|---|---|---|---|---|
| pH | S($\times 10^5$) | pH | S($\times 10^5$) | pH | S($\times 10^5$) | pH | S($\times 10^5$) |
| 13.80 | 327 | 13.19 | 178 | 12.50 | 261 | 12.22 | 1029 |
| 13.71 | 216 | 12.97 | 67.3 | 12.24 | 88.7 | 11.95 | 319 |
| 13.51 | 91.8 | 12.77 | 28.3 | 11.99 | 33.7 | 11.68 | 104 |
| 13.34 | 45.1 | 12.52 | 11.2 | 11.76 | 14.8 | 11.35 | 29.1 |
| 13.18 | 25.2 | 12.29 | 5.74 | 11.55 | 8.03 | 11.14 | 12.6 |
| 12.85 | 6.12 | 11.05 | 0.54 | 11.25 | 2.92 | 10.85 | 5.27 |
| 12.21 | 1.68 | 10.84 | 0.46 | 10.99 | 2.14 | 10.54 | 3.06 |
| 11.51 | 0.50 | 10.14 | 0.31 | 10.75 | 1.38 | 10.22 | 2.14 |
| 11.50 | 0.31 | 9.43 | 0.38 | 10.25 | 0.92 | 10.01 | 2.06 |
| 11.10 | 0.24 | 9.18 | 0.54 | 10.02 | 0.84 | 9.71 | 1.84 |
| 9.83 | 0.23 | 8.97 | 0.61 | 9.55 | 0.76 | 9.54 | 1.76 |
| 9.49 | 0.23 | 8.91 | 0.92 | 9.08 | 0.87 | 8.93 | 1.68 |
| 9.27 | 0.31 | 8.72 | 0.84 | 8.77 | 0.99 | 8.55 | 1.84 |
| 9.14 | 0.38 | 8.67 | 1.22 | 8.52 | 1.15 | 8.38 | 2.06 |
| 8.99 | 0.46 | 8.41 | 1.30 | 8.27 | 1.45 | 8.05 | 2.06 |
| 8.55 | 1.33 | 7.90 | 4.74 | 8.04 | 1.84 | 7.89 | 1.99 |
| 7.96 | 13.2 | 7.63 | 17.2 | 7.82 | 2.43 | 7.65 | 2.37 |
| 7.70 | 48.3 | 7.44 | 32.1 | 7.54 | 4.97 | 7.15 | 7.22 |
| 7.32 | 265 | 7.31 | 49.7 | 7.26 | 10.7 | 6.94 | 13.1 |
| 7.22 | 415 | 7.00 | 204 | 7.05 | 19.6 | | |
| 7.06 | 844 | | | 6.75 | 53.4 | | |

FIG. 17

```
                         SEQUENCE LISTING

<160> NUMBER OF SEQ ID NOS: 6

<210> SEQ ID NO 1
<211> LENGTH: 20
<212> TYPE: DNA
<213> ORGANISM: Homo sapiens

<400> SEQUENCE: 1
agggccaaga cgaagacatc                                                    20

<210> SEQ ID NO 2
<211> LENGTH: 21
<212> TYPE: DNA
<213> ORGANISM: Homo sapiens

<400> SEQUENCE: 2
agatcacgtc atcgcacaac a                                                  21

<210> SEQ ID NO 3
<211> LENGTH: 20
<212> TYPE: DNA
<213> ORGANISM: Homo sapiens

<400> SEQUENCE: 3
gttttgcccc gtattatgga                                                    20

<210> SEQ ID NO 4
<211> LENGTH: 20
<212> TYPE: DNA
<213> ORGANISM: Homo sapiens

<400> SEQUENCE: 4
ggaagttcag gattgccgta                                                    20

<210> SEQ ID NO 5
<211> LENGTH: 22
<212> TYPE: DNA
<213> ORGANISM: Homo sapiens

<400> SEQUENCE: 5
ggattcctat gtgggcgacg ga                                                 22

<210> SEQ ID NO 6
<211> LENGTH: 21
<212> TYPE: DNA
<213> ORGANISM: Homo sapiens

<400> SEQUENCE: 6
cgctcggtga ggatcttcat g                                                  21
```

METAL HYDROXIDE COMPLEX COMPRISING MODIFIED MULTILAYER HYDROXIDE STRUCTURE COMPRISING ACTIVE INGREDIENT AND METHOD OF MANUFACTURING SAME

TECHNICAL FIELD

The present invention relates to a metal hydroxide complex including a modified multilayer hydroxide structure, including a base layer, a surface layer and an active ingredient, and a method of manufacturing the same.

REFERENCE TO AN ELECTRONIC SEQUENCE LISTING

The contents of the electronic sequence listing (16969710-seq-listing_ST25.txt; Size: 1405 bytes; and Date of Creation: Feb. 18, 2025) is herein incorporated by reference in its entirety.

BACKGROUND ART

Active ingredients for cosmetics, which may be administered into the skin and may directly exhibit the effects thereof, may include vitamins and the like. Vitamins are essential substances in vivo, having functions such as promoting metabolism of living bodies, exhibiting antioxidant effects, protecting cell walls, enhancing immunity, increasing infection resistance, etc., and in most primates, biosynthesis thereof is impossible, and ingestion through food is essential, and various vitamin deficiencies may be caused upon insufficient ingestion thereof. Moreover, in skin beauty and treatment, vitamins play a very important role in maintaining healthy skin, such as preventing pigmentation, promoting collagen synthesis, blocking UV radiation, preventing drying and keratinization of the skin, preventing wrinkles, moisturizing the skin, and the like. Examples of vitamins include retinol (vitamin A), ascorbic acid (vitamin C), tocopherol (vitamin E) and derivatives thereof.

In addition to vitamins, active ingredients for cosmetics may include α-hydroxy acids (AHA) having a function of promoting skin metabolism by removing the stratum corneum of the skin, such as lactic acid, citric acid, and salicylic acid; kojic acid (5-hydroxy-2-(hydroxymethyl)-4H-pyran-4-one), which has a function of skin whitening through inhibition of melanin biosynthesis; indole-3-acetic acid ($C_{10}H_9NO_2$), which prevents wrinkles through promotion of fibroblast proliferation activity; and salicylic acid (2-hydroxybenzoic acid, $C_7H_6O_3$), which has antioxidant and acne treatment functions, and a variety of other materials for cosmetic ingredients are known.

However, most of the above-mentioned materials for cosmetic ingredients are limited in practical applicability due to problems related to stability of the material itself, skin irritation and toxicity, sustained release, dispersibility, etc., and thus the functions or efficacies thereof are not sufficiently exhibited. For example, vitamins are physically and chemically very unstable, and are easily broken down by heat, light, moisture, oxygen, alkali, and the like, so the function and efficacy thereof are lowered or discoloration or offensive odor occurs. Moreover, α-hydroxy acids such as lactic acid are problematic in that they cause skin irritation. In the case of kojic acid, melanin pigments or melanocytes are degenerated due to the property of penetrating to the stratum basale, and thus, when used at high concentrations, it causes various skin diseases such as dermatitis, skin cancer, and the like, and discoloration may occur due to oxidation under conditions of light and high temperature. Indole-3-acetic acid is also poorly resistant to external environment, heat, light, moisture, oxygen, etc., and is particularly sensitive to light, causing a problem of discoloration and offensive odors.

Therefore, thorough research has been carried out in order to obtain effects of stabilizing the active materials, reducing skin irritation or toxicity and the like. Specifically, Korean Patent No. 115076 discloses a method of manufacturing vitamin nanocapsules by impregnating and encapsulating inner-phase microglobules with vitamins and various active ingredients and stabilizing the same again using a double-layer lipid membrane and a water dispersion polymer. In addition, Korean Patent Application Publication No. 2000-0048451 discloses a method of encapsulating the lipophilic active ingredient globule core with synthetic and natural water-dispersible anionic polymers that are insoluble in water.

However, the aforementioned methods are time-consuming due to a complicated method, process, etc. for treating the active material, and are thus not economical. Moreover, since coating the active ingredient must be additionally performed, the effect of the active ingredient alone may be reduced, and there is a problem in that the active material is not included in excess in the complex.

(Patent Document 1) Korean Patent No. 115076
(Patent Document 2) Korean Patent Application Publication No. 2000-0048451

DISCLOSURE

Technical Problem

The present invention has been made keeping in the problems encountered in the related art, and the present invention is intended to provide a metal hydroxide complex including a multilayer hydroxide structure, including a base layer, a surface layer and an active ingredient, in which the active ingredient alone may be stably included in excess inside the metal hydroxide complex, making it possible to maximize the effect of the active ingredient, and a method of manufacturing the same, which is made economical by shortening the manufacturing process because the active ingredient may be included in a more stable and effective manner.

Technical Solution

The present invention provides a metal hydroxide complex including the modified multilayer hydroxide structure of Chemical Formula 1 below, which includes a base layer, a surface layer and an active ingredient.

$$\{[M_x(OH)_z]^B[M_y(OH)_w]^S\}\{(A^n)_q\} \cdot m(H_2O) \quad \text{[Chemical Formula 1]}$$

Here, $[M_x(OH)_z]^B$ represents the base layer of the multilayer hydroxide structure, and $[M_y(OH)_w]^S$ represents the surface layer of the multilayer hydroxide structure, M is anyone divalent metal cation selected from the group consisting of $Ca^{2+}$, $Mg^{2+}$, $Cu^{2+}$, $Zn^{2+}$, $Ni^{2+}$, $Co^{2+}$ and $Fe^{2+}$, x is 0.6 to 3,
y is 0 to 2,
z is 1 to 5,
w is 0 to 4,
z+w is 1 to 9,
q is 1 to 4, m is 0.1 to 10, n is a charge number of A, and the active ingredient is represented by A, in which A is an anionic compound including, as a functional group having electrostatic attraction depending on pKa, at least one selected from the group consisting of a hydroxyl group (—OH), a carbonyl group (—CO—), a formyl group (—CHO), a carboxyl group (—COOH), a sulfate group (—$SO_3^{2-}$), a dihydrogen phosphate group (—$H_2PO_4^{2-}$) and a phosphate group (—$PO_4^{3-}$).

The present invention provides a metal hydroxide complex manufactured by subjecting an active ingredient and a metal hydroxide to coprecipitation through a precipitation reaction using an alcohol and water.

The present invention provides a method of manufacturing a metal hydroxide complex including subjecting an active ingredient and a metal hydroxide to coprecipitation through a precipitation reaction using an alcohol and water.

Advantageous Effects

According to the present invention, an active ingredient can be included in greater excess in a multilayer hydroxide structure, has excellent sustained release performance, and is included in a stable state and in a large amount in a metal hydroxide complex, thereby improving the effect of the active ingredient that is delivered.

Moreover, the metal hydroxide complex stably includes the unstable active ingredient, thereby enabling long-term storage of the active ingredient, and, when delivered to the skin, it is possible to minimize irritation, thereby providing a non-irritating effect.

In the present invention, the active ingredient is included in the multilayer hydroxide structure, thereby exhibiting superior collagen expression effects.

BRIEF DESCRIPTION OF DRAWINGS

FIG. 17 shows the solubility of zinc hydroxide, *S being the solubility represented by moles of zinc per kg of water.

BEST MODE

Figure 1:
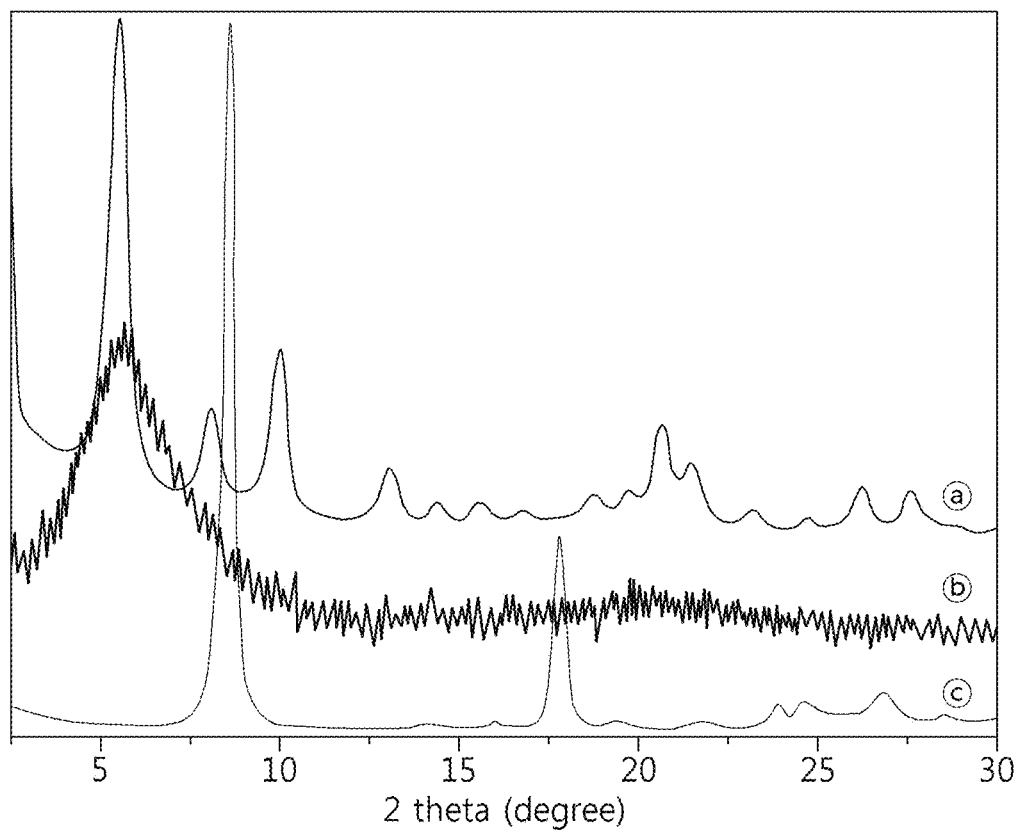
FIG. 1 is an XRD graph of each material of Table 1, in which ⓐ is a graph of MZLA, ⓑ is a reference graph and ⓒ is a graph of a zinc basic salt.

The present invention pertains to a metal hydroxide complex including the modified multilayer hydroxide structure of Chemical Formula 1 below, including a base layer, a surface layer and an active ingredient.

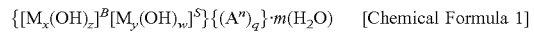

$\{[M_x(OH)_z]^B[M_y(OH)_w]^S\}\{(A^n)_q\}\cdot m(H_2O)$     [Chemical Formula 1]

Here, [$M_x(OH)_z$]$^B$ represents the base layer of the multilayer hydroxide structure, and [$M_y(OH)_w$]$^S$ represents the surface layer of the multilayer hydroxide structure, M is any one divalent metal cation selected from the group consisting of $Ca^{2+}$, $Mg^{2+}$, $Cu^{2+}$, $Zn^{2+}$, $Ni^{2+}$, $Co^{2+}$ and $Fe^{2+}$, x is 0.6 to 3, y is 0 to 2, z is 1 to 5 w is 0 to 4, z+w is 1 to 9, q is 1 to 4, m is 0.1 to 10, n is the charge number of A, and the active ingredient is represented by A, in which A is an anionic compound including, as a functional group having electrostatic attraction depending on pKa, at least one selected from the group consisting of a hydroxyl group (—OH), a carbonyl group (—CO—), a formyl group (—CHO), a carboxyl group (—COOH), a sulfate group (—$SO_3^{2-}$), a dihydrogen phosphate group (—$H_2PO_4^{2-}$) and a phosphate group (—$PO_4^{3-}$).

The active ingredient represented by A may include at least one functional group selected from the group consisting of a hydroxyl group (—OH), a carbonyl group (—CO—), a formyl group (—CHO), a carboxyl group (—COOH), a sulfate group (—$SO_3^{2-}$), a dihydrogen phosphate group (—$H_2PO_4^{2-}$) and/or a phosphate group (—$PO_4^{3-}$).

More specifically, Chemical Formula 1 may be represented by $\{[Zn_3(OH)_4]^B[Zn_2(OH)_3]^S\}\{(ascorbic\ acid)_2\}\cdot 2(H_2O)$, $\{[Zn_3(OH)_4]^B[Zn_1(OH)_2]^S\}\{(ascorbic\ acid)_2\}\cdot 3(H_2O)$, $\{[Zn_3(OH)_4]^B[Zn_1(OH)_1]^S\}\{(ascorbic\ acid)_2\}\cdot 3(H_2O)$ and $\{[Zn_3(OH)_3]^B[Zn_1(OH)_1]^S\}\{(ascorbic\ acid)_2\}\cdot 2(H_2O)$.

A, which is the active ingredient, may be anionic, and examples of the active ingredient including a functional group having electrostatic attraction depending on pKa, particularly a hydroxyl group (—OH), may include ascorbic acid, 4-n-butylresorcinol, tocopherol, bakuchiol, (+)-catechin, curcumin, hydroxytyrosol, phytol, resorcinol, carthamin, luteolin, corilagin, resveratrol, retinol, rutin, hydroquinone, asiaticoside, madecassoside, ginsenoside, borneol, diosmetin, aspalathin, eugenol, mangostin, pelargonidin, cyaniding, delphinidin, peonidin, petunidin, malvidin, lutein, quercetin, adenosine, ascorbyl palmitate, ascorbyl glucoside, pyridoxine, thiamine, saponin, secoisolariciresinol, matairesinol, pinoresinol, medioresinol, lariciresinol, syringaresinol, artigenin, enterolactone, and enterodiol.

Examples of the active ingredient including a carboxyl group (—COOH) may include arachidonic acid, abietic acid, abscisic acid, α-lipoic acid, azelaic acid, caffeic acid, hydroxybenzoic acid, protocatechuic acid, ellagic acid, ferulic acid, fulvic acid, oleanolic acid, phenolic acid, hydroxycinnamic acid, vanillic acid, protocatechuic acid, salvianic acid, sinapic acid, tranexamic acid, valeric acid, veratric acid, chlorogenic acid, asiatic acid, madecassic acid, suberic acid, hyaluronic acid, ursolic acid, ascorbic acid, salvianolic acid B, pyridine-3-carboxylic acid, ascorbyl palmitate, ascorbyl glucoside, carnitine, pantothenic acid, biotin, folic acid, alliin, glutathione, serine, glycine, alanine, avenanthramide, threonine, cysteine, valine, leucine, methionine, proline, phenylalanine, tyrosine, tryptophan, aspartic acid, glutamic acid, asparagine, glutamine, histidine, lysine, arginine and the like.

Examples of the active ingredient including a formyl group (—CHO) may include decanal, retinaldehyde, cinnamaldehyde, catechin-aldehyde, coniferyl aldehyde, syringaldehyde, vanillin and the like.

Examples of the active ingredient including a carbonyl group (—CO—) may include edaravone, idebenone, coenzyme Q10, ubiquinone, MitoQ, astaxanthin, caffeine, paraxanthine, theophylline, matairesinol, physcion, propafenone, coumarin, genistein, chalcone, naringenin, bergenin, amentoflavone, Biochanin A, riboflavin, sesamin and the like.

Examples of the anionic active ingredient including a sulfate group ($-SO_3^{2-}$) may include dextran sulfate, ferrous sulfate, ferulic acid-4-O-sulfate, ascorbyl sulfate and the like.

Also, examples of the compound including a dihydrogen phosphate group ($-H_2PO_4^{2-}$) may include adenosine monophosphate, retinol phosphate, ascorbyl palmitate phosphate and the like.

Also, examples of the compound including a phosphate group ($-PO_4^{3-}$) may include adenosine diphosphate, adenosine triphosphate, ascorbyl phosphate and the like.

More specifically, the active ingredient preferably includes at least one selected from the group consisting of ascorbic acid, cysteine, salicylic acid, abscisic acid, serine, alanine, glycine, carnitine, isoleucine, leucine, suberic acid, proline, valine, azelaic acid, phenylalanine, caffeic acid, tryptophan, coumarin, tyrosine, aspartic acid, ferulic acid, glutamic acid, arginine, pyridine-3-carboxylic acid, histidine, lysine, ascorbyl sulfate, threonine, protocatechuic acid, ascorbyl phosphate, methionine, valeric acid, asparagine, glutamine, vanillic acid, hydroxybenzoic acid, hydroxycinnamic acid, cinnamaldehyde, pantothenic acid, biotin, retinol, α-lipoic acid, resveratrol, 4-n-butylresorcinol, hydroxytyrosol, pyridoxine, sinapic acid, coniferyl aldehyde, syringaldehyde and theophylline, so that a powder-X-ray diffraction pattern may have peak values of diffraction angles (2θ) of 5.96±1°, 33.46±1° and 59.3±1°.

Figure 11:
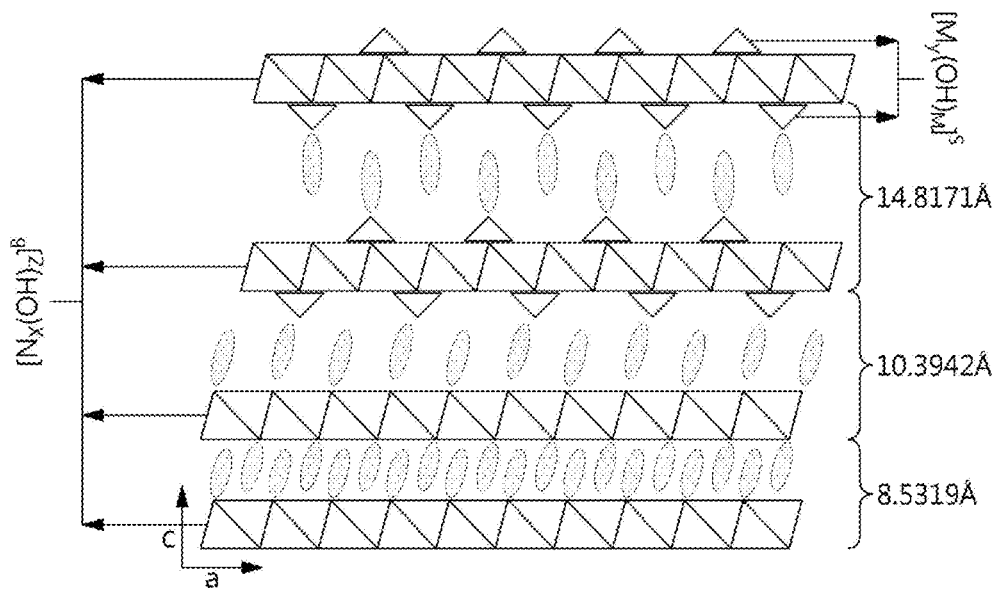
FIG. 11 shows the specific configuration of a metal hydroxide complex according to the present invention, [$M_x(OH)_z$]$^B$ representing a base layer and [$M_y(OH)_w$]$^S$ representing a surface layer.

In the present invention, the multilayer structure means that the base layer and/or the surface layer may be modified in the structural form of metal hydroxide that is generally formed, and more specifically in the metal hydroxide structure, the structural form of metal hydroxide of the surface layer among the base layer and the surface layer may be more variable. Particularly, the base layer and the surface layer are illustrated in FIG. 11. The multilayer structure may include a modified multilayer structure configured such that a conventional metal hydroxide structure having a constant arrangement of a double-layer structure is gradually formed into an asymmetric layered structure to thus induce modification of the double-layer structure. It means that the structure of the surface layer is modified, so that individual metal hydroxide structures are formed in different sizes and are stacked to form a multilayer structure. The multilayer structure may have two to five layers, and a three-layer structure is preferable.

In the present invention, the multilayer hydroxide structure may have a powder-X-ray diffraction pattern having peak values of diffraction angles (2θ) of 5.96±1°, 33.46±1° and 59.3±1°. Here, the multilayer hydroxide structure may include an asymmetric and/or modified layered structure. More preferably, it may have peak values of (2θ) of 5.96±0.5°, 33.46±0.5° and 59.3±0.5°, and the metal hydroxide complex, when satisfying the above peak values, may be provided in the form of an asymmetric and/or modified layered structure (two to five layers).

In the present invention, the multilayer hydroxide structure may have a powder-X-ray diffraction pattern having peak values of diffraction angles (2θ) of 5.96±1°, 8.5±1°, 10.36±1°, 13.36±1°, 19±1°, 20.84+1°, 21.7±1°, 26.34±1°, 37.68±1°, 31.48±1°, 33.78±1°, 34.88±1° and 59.3±1°. The metal hydroxide complex, when satisfying the above peak values, may be provided in the form of a layered structure, and the layered structure may include a modified asymmetric layered structure. More specifically, the layered structure may be formed using ethanol and/or water as a solvent. An asymmetric layered structure and/or a modified layered structure may be formed by adjusting the solvent ratio, and the formed asymmetric layered structure and/or modified layered structure may be a layered structure having multiple layers, for example, two to five layers.

In the present invention, the multilayer hydroxide structure may have a powder-X-ray diffraction pattern having peak values of diffraction angles (2θ) of 6.28±1°, 8.88±1°, 10.32±1°, 13.42±1°, 21.04±1°, 28.14±1°, 33.5±1° and 59.16±1°. The metal hydroxide complex, when satisfying the above peak values, may be provided in the form of a layered structure, and the layered structure may include a modified asymmetric layered structure. More specifically, the layered structure may be formed using methanol and/or water as a solvent. By adjusting the solvent ratio, an asymmetric layered structure and/or a modified layered structure may be formed, and the formed asymmetric layered structure and/or modified layered structure may be a layered structure having multiple layers, for example, two to five layers.

In the present invention, the multilayer hydroxide structure may have a powder-X-ray diffraction pattern having peak values of diffraction angles (2θ) of 6.02±1°, 8.5±1°, 10.4±1°, 13.38±1°, 21.02±1°, 26.42±1°, 27.88±1°, 33.52±1° and 59.1±1°. The metal hydroxide complex, when satisfying the above peak values, may be provided in the form of a layered structure, and the layered structure may include a modified asymmetric layered structure. More specifically, the layered structure may be formed using propanol and/or water as a solvent. The propanol is preferably n-propanol.

In the present invention, the multilayer hydroxide structure may have a powder-X-ray diffraction pattern having peak values of diffraction angles (2θ) of 6.22±1°, 10.5±1° and 13.36±1°, 20.94±1°, 33.46±1° and 59.28±1°. The metal hydroxide complex, when satisfying the above peak values, may be provided in the form of a layered structure, and the layered structure may include a modified asymmetric layered structure. More specifically, the layered structure may be formed using butanol and/or water as a solvent. The butanol is preferably n-butanol.

More specifically, in the present invention, the multilayer hydroxide structure may have a powder-X-ray diffraction pattern having peak values of diffraction angles (2θ) of 5.96±0.5°, 8.5±0.5°, 10.36±0.5°, 13.36±0.5°, 19±0.5°, 20.84±0.5°, 21.7±0.5°, 26.34±0.5°, 37.68±0.5°, 31.48±0.5°, 33.78±0.5°, 34.88±0.5° and 59.3±0.5°. The metal hydroxide complex, when satisfying the above peak values, may be provided in the form of a layered structure, and the layered structure may include a modified asymmetric and/or modified layered structure. More specifically, the layered structure may be formed using ethanol and/or water as a solvent.

In the present invention, the multilayer hydroxide structure may have a powder-X-ray diffraction pattern having peak values of diffraction angles (2θ) of 6.28±0.5°, 8.88±0.5°, 10.32±0.5°, 13.42±0.5°, 21.04±0.5°, 28.14±0.5°, 33.5±0.5° and 59.16±0.5°. The metal hydroxide complex, when satisfying the above peak values, may be provided in the form of a layered structure, and the layered structure may include a modified asymmetric and/or modified layered structure. More specifically, the layered structure may be formed using methanol and/or water as a solvent.

In the present invention, the multilayer hydroxide structure may have a powder-X-ray diffraction pattern having peak values of diffraction angles (2θ) of 6.02±0.5°, 8.5±0.5°, 10.4±0.5°, 13.38±0.5°, 21.02±0.5°, 26.42±0.5°, 27.88±0.5°, 33.52±0.5° and 59.1±0.5°. The metal hydroxide complex, when satisfying the above peak values, may be provided in the form of a layered structure, and the layered structure may include a modified asymmetric and/or modified layered structure. More specifically, the layered structure may be formed using propanol and/or water as a solvent. The propanol is preferably n-propanol.

In the present invention, the multilayer hydroxide structure may have a powder-X-ray diffraction pattern having peak values of diffraction angles (2θ) of 6.22±0.5°, 10.5±0.5°, 13.36±0.5°, 20.94±0.5°, 33.46±0.5° and 59.28±0.5°. The metal hydroxide complex, when satisfying the above peak values, may be provided in the form of a layered structure, and the layered structure may include a modified asymmetric and/or modified layered structure. More specifically, the layered structure may be formed using butanol and/or water as a solvent. The butanol is preferably n-butanol.

The present invention pertains to a metal hydroxide complex obtained by subjecting an active ingredient and a metal hydroxide structure precursor to coprecipitation through a precipitation reaction using an alcohol and water.

More specifically, the metal hydroxide structure of the present invention may cause a precipitation reaction using a precursor.

In the present invention, specific examples of the metal hydroxide structure precursor that may cause a precipitation reaction preferably include ZnO, $ZnSO_4$, $ZnCl_2$, $ZnCO_3$, $Zn(NO_3)_2 6H_2O$, $Zn(CH_3COO)_2$, CaO, $CaCl_2$, $Ca(NO_3)_2 6H_2O$, $CaSO_4$, $CaCO_3$, $Ca(OH)_2$, MgO, $MgCl_2$, $MgSO_4$, $Mg(NO_3)_2 6H_2O$, CuO, $Cu(NO_3)_2 6H_2O$, $CuCl_2$, $CuSO_4$, $Co(NO_3)_2$, $CoCO_3$, $CoCl_2$, $Co(OH)_2$, $CoSO_4$, $Co(CH_3COO)_2$, NiO, $NiCl_2$, $Ni(NO_3)_2$, $NiSO_4$, $NiCO_3$, $Ni(OH)_2$, FeO, $FeCl_3$, $Fe(NO_3)_3$, $FeSO_4$, $FeCO_3$, and $Fe(OH)_2$, and may preferably include ZnO, $ZnSO_4$, $ZnCl_2$, $ZnCO_3$, $Zn(NO_3)_2 6H_2O$, and $Zn(CH_3COO)_2$.

The alcohol may be at least one selected from the group consisting of methanol, ethanol, propanol and butanol. The propanol and/or butanol may be n-propanol and/or n-butanol. In the coprecipitation step, the ratio of alcohol and water may be 1:9 to 9:1, and preferably 2.4:7.6 to 6.2:3.8. When the ratio of alcohol and water falls in the above range, a modified multilayer structure is formed, which is desirable.

The present invention pertains to a method of manufacturing a metal hydroxide complex including subjecting an active ingredient and a metal hydroxide structure to coprecipitation through a precipitation reaction using an alcohol and water. The alcohol may be at least one selected from the group consisting of methanol, ethanol, propanol and butanol. Here, it is preferred that the propanol be n-propanol and the butanol be n-butanol.

More specifically, the method of the present invention includes forming a metal hydroxide structure precursor using a precursor, preparing an active ingredient solution by dissolving an active ingredient using an alcohol and water, and subjecting the metal hydroxide structure precursor and the active ingredient solution to a precipitation reaction.

In the present invention, when the active ingredient and the metal hydroxide are precipitated using an alcohol and water, the active ingredient alone may be introduced into the metal hydroxide structure without the need for additional processes and/or steps, thus making it possible to stabilize the active ingredient. Moreover, the use of alcohol and water as the solvent is capable of reducing the number of processing steps, and the total processing time of the metal hydroxide complex to be manufactured in the present invention is shortened to the range of 3 hr to 5 hr, and preferably 3 hr 30 min to 4 hr 30 min. The conventional processing method for producing the same material takes 10 to 12 hr, meaning that it is possible to provide an effect of significantly shortening the processing time. Moreover, it is possible to achieve the effect in which the active ingredient in the metal hydroxide complex is further added by at least 5 to 15% compared to the conventional amount based on the rational formula. Here, the alcohol may be at least one selected from the group consisting of methanol, ethanol, propanol and butanol, and ethanol is preferably used because the active ingredient may be very efficiently included in excess in the metal hydroxide complex.

More specifically, the use of the alcohol during the synthesis process is capable of preventing deterioration (oxidation, browning, etc.) of the active material, clogging of the ultrafiltration (UF) filter used for washing the slurry obtained after synthesis, and deterioration of the material during the UF washing process three times. Moreover, the drying time may be reduced compared to when using water alone upon drying using a spray dryer after washing, and deterioration of the active material may be prevented due to drying at 65 to 75° C., and preferably 70° C. (drying at 95° C. or more when using water). In particular, ethanol is preferably used as the alcohol so that the above process effects may be very efficiently achieved.

MODE FOR INVENTION

Figure 16:
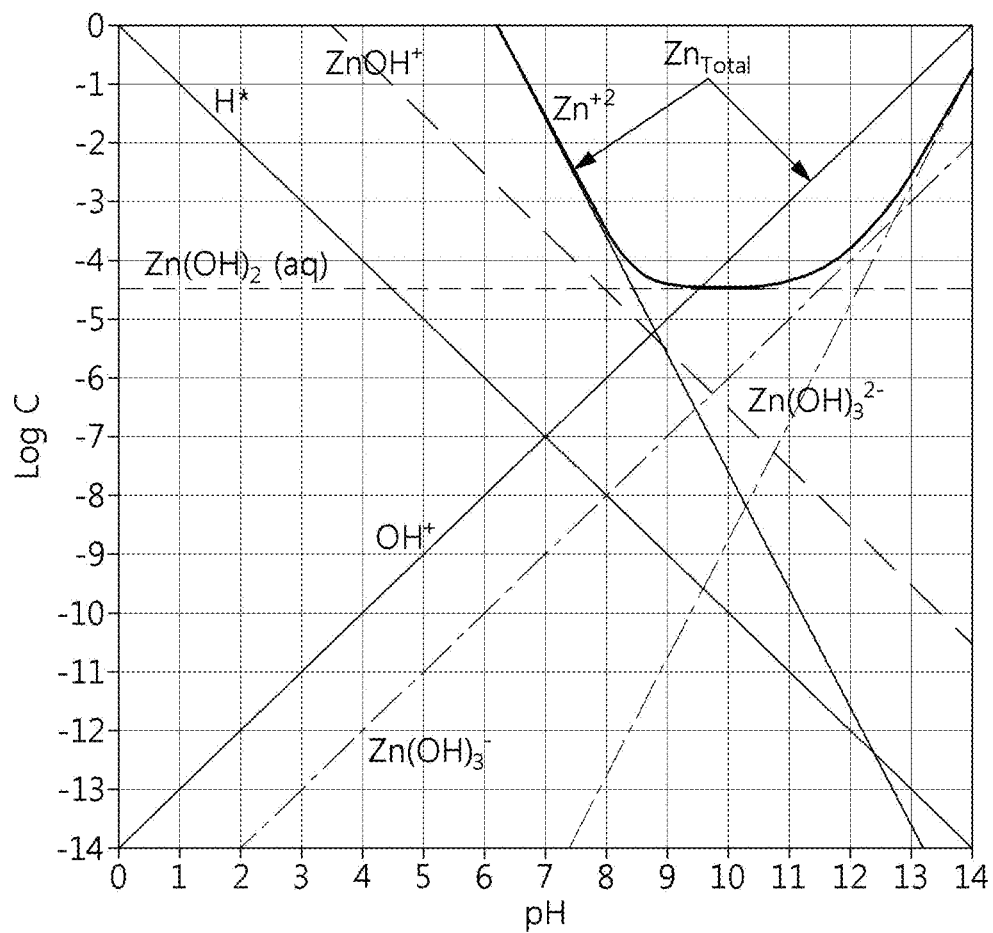
FIG. 16 shows a zinc hydroxide solubility curve diagram.

In the present invention, the basic principle of synthesis of metal hydroxide is a precipitation reaction. A precipitation reaction may be determined based on Equation 1 below, and is related to the solubility product of Equation 1 below. As for the production of a precipitate, a saturated solution may result when the concentration product of ions equals the solubility product of the precipitate, and precipitation may occur in excess of the saturation concentration when the concentration product of ions exceeds the solubility product of the precipitate. When the concentration product of ions required of the precipitate is less than the solubility product of the precipitate, an unsaturated solution may result and thus precipitation does not occur. Therefore, in order to form a precipitate, a precursor has to be used in a predetermined amount or more so as to exceed the solubility product of the precipitate. However, if the precursor is used in too large an amount, care must be taken because there may occur a problem in which the precipitate dissolves again due to the influence of counter ions or the formation of complex compounds. The details of the precipitation reaction related to the present invention are shown in FIGS. 15 to 17.

$$[K_{sp}] = [Zn^{2+}][OH^-]^2$$ [Equation 1]

Figures 14, 15:
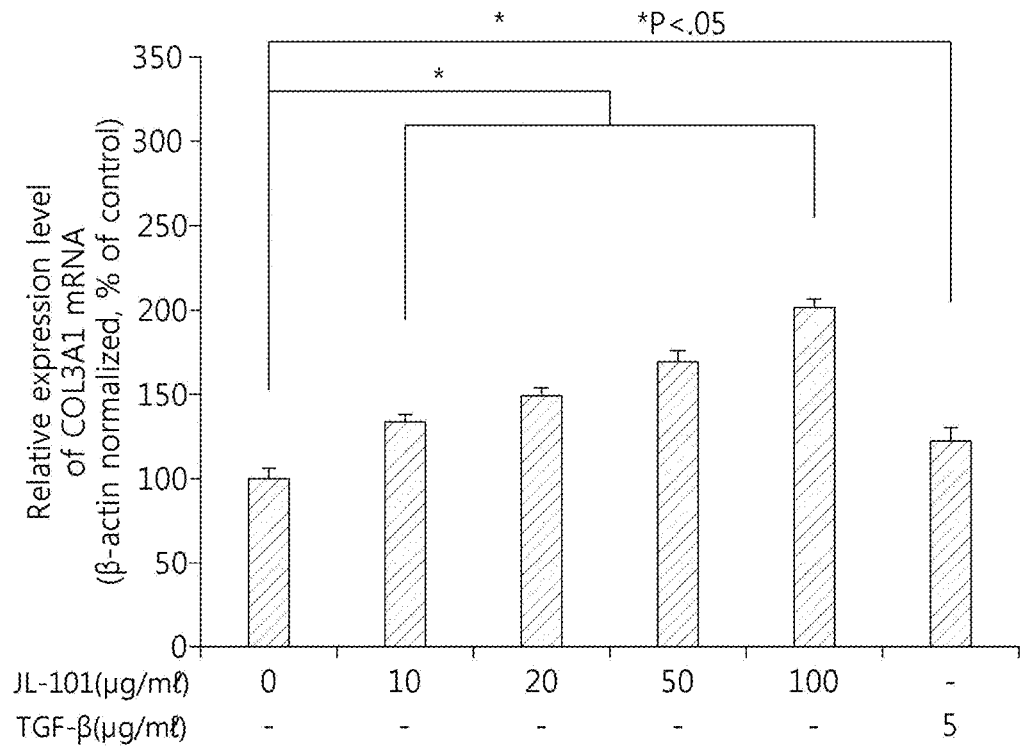
FIG. 14 shows changes in expression of type 3 collagen gene (COL3A1) of human dermal fibroblasts treated with the metal hydroxide complex of the present invention, the horizontal axis representing the concentration of the treated sample material and the vertical axis representing the expression level of COL3A1 mRNA.
FIG. 15 shows the solubility of Zn.

The solubility product may be represented by $Zn^{2+}$ (aq), $Zn(OH)^+$ (aq), $Zn(OH)_2$ (aq), $Zn(OH)_3^-$ (aq), and $Zn(OH)_4^{2-}$ (aq), and is shown in relation to the solubility data based on the equilibrium and equilibrium constant shown in FIG. 15, making it easy to relate the listed species to other species.

Synthesis Example 1: Preparation 1 of Multilayer Metal Hydroxide Crystal in which Vitamin C (Ascorbic Acid) is Inserted Between Layers of Layered Metal Salt 30 g of ZnO and 1197 ml of deionized water not containing carbonate ions ($CO_3^{2-}$) were stirred (400 rpm) at room temperature in a nitrogen atmosphere in a main tank, and a concentrated HCl solution was slowly added dropwise thereto so that the pH thereof was titrated to the range of 0.5 to 1.26 g of vitamin C was dissolved in 230 ml of deionized water and 175 ml of ethanol in an auxiliary tank 1, and the vitamin C solution of the auxiliary tank 1 was added to the main tank and stirred for 30 min in a nitrogen atmosphere. While the stirring rate (700 rpm) of the main tank was maintained, a 5 M sodium hydroxide aqueous solution of an auxiliary tank 2 was added thereto so that the pH thereof was titrated to the range of about 6.5 to 7.5, followed by induction of a precipitation reaction with stirring (700 rpm) for 3 hr. After reaction, the pH was measured to be 6.5 to 7.0, and after termination of the reaction, a white slurry precipitate was obtained. The precipitate was subjected to centrifugation and washing using ethanol (50%) three times, thus removing unreacted salts and vitamin C. After centrifugation, the precipitate separated from the supernatant was dried in a hot-air dryer (inlet temperature: 70° C.) using ethanol (95%), thereby obtaining 35.4 g of a pale beige vitamin C-zinc hydroxide (yield: 58.8%, ascorbic acid content: 42.24%). $\{[Zn_3(OH)_4]^B[Zn_2(OH)_3]^S\}\{(ascorbic\ acid)_2\}\cdot 2(H_2O)$

Synthesis Example 2: Preparation 2 of Multilayer Metal Hydroxide Crystal in which Vitamin C is Inserted Between Layers of Layered Metal Salt 30 g of ZnO, 549 ml of deionized water not containing carbonate ions ($CO_3^{2-}$) and 628 ml of ethanol (>98%) were stirred (400 rpm) at room temperature in a nitrogen atmosphere in a main tank, and a concentrated HCl solution was slowly added dropwise thereto so that the pH thereof was titrated to the range of 0.5 to 1.26 g of vitamin C was dissolved in 230 ml of deionized water and 175 ml of ethanol in an auxiliary tank 1, and the vitamin C solution of the auxiliary tank 1 was added to the main tank and stirred for 30 min in a nitrogen atmosphere. While the stirring rate (700 rpm) of the main tank was maintained, a 5 M sodium hydroxide aqueous solution of an auxiliary tank 2 was added thereto so that the pH thereof was titrated to the range of about 6.5 to 7.5, followed by induction of a precipitation reaction with stirring (700 rpm) for 3 hr. After reaction, the pH was measured to be 6.5 to 7.0, and after termination of the reaction, a white slurry precipitate was obtained. The precipitate was subjected to centrifugation and washing using ethanol (50%) three times, thus removing unreacted salts and vitamin C. After centrifugation, the precipitate separated from the supernatant was dried in a hot-air dryer (inlet temperature: 70° C.) using ethanol (95%), thereby obtaining 37.6 g of a vitamin C-zinc hydroxide having a pale ivory color close to white (yield: 62.4%, ascorbic acid content: 45.19%). $\{[Zn_3(OH)_4]^B[Zn_1(OH)_2]^S\}\{(ascorbic\ acid)_2\}\cdot 3(H_2O)$

Synthesis Example 3: Preparation 3 of Multilayer Metal Hydroxide Crystal in which Vitamin C is Inserted Between Layers of Layered Metal Salt 30 g of ZnO, 254 ml of deionized water not containing carbonate ions ($CO_3^{2-}$) and 943 ml of ethanol (>98%) were stirred (400 rpm) at room temperature in a nitrogen atmosphere in a main tank, and a concentrated HCl solution was slowly added dropwise thereto so that the pH thereof was titrated to the range of 0.5 to 1.26 g of vitamin C was dissolved in 230 ml of deionized water and 175 ml of ethanol in an auxiliary tank 1, and the vitamin C solution was added to the main tank and stirred for 30 min in a nitrogen atmosphere. While the stirring rate (700 rpm) of the main tank was maintained, a 5 M sodium hydroxide aqueous solution of an auxiliary tank 2 was added thereto so that the pH thereof was titrated to the range of about 6.5 to 7.5, followed by induction of a precipitation reaction with stirring (700 rpm) for 3 hr. After reaction, the pH was measured to be 6.5 to 7.0, and after termination of the reaction, a white slurry precipitate was obtained. The precipitate was subjected to centrifugation and washing using ethanol (50%) three times, thus removing unreacted salts and vitamin C. After centrifugation, the precipitate separated from the supernatant was dried in a hot-air dryer (inlet temperature: 70° C.) using ethanol (95%), thereby obtaining 39.5 g of a product having a pale ivory color close to white (yield: 65.6%, ascorbic acid content: 46.35%). $\{[Zn_3(OH)_4]^B[Zn_1(OH)_1]^S\}\{(ascorbic\ acid)_2\}\cdot 3(H_2O)$

Synthesis Example 4: Preparation 4 of Multilayer Metal Hydroxide Crystal in which Vitamin C is Inserted Between Layers of Layered Metal Salt 30 g of ZnO, 68 ml of deionized water not containing carbonate ions ($CO_3^{2-}$) and 1129 ml of ethanol (>98%) were stirred (400 rpm) at room temperature in a nitrogen atmosphere in a main tank, and a concentrated HCl solution was slowly added dropwise thereto so that the pH thereof was titrated to the range of 0.5 to 1.26 g of vitamin C was dissolved in 50 ml of deionized water and 355 ml of ethanol in an auxiliary tank 1, and the vitamin C solution was added to the main tank and stirred for 30 min in a nitrogen atmosphere. While the stirring rate (700 rpm) of the main tank was maintained, a 5 M sodium hydroxide aqueous solution of an auxiliary tank 2 was added thereto so that the pH thereof was titrated to the range of about 6.5 to 7.5, followed by induction of a precipitation reaction with stirring (700 rpm) for 3 hr. After reaction, the pH was measured to be 6.5 to 7.0, and after termination of the reaction, a white slurry precipitate was obtained. The precipitate was subjected to centrifugation and washing using ethanol (50%) three times, thus removing unreacted salts and vitamin C. After centrifugation, the precipitate separated from the supernatant was dried in a hot-air dryer (inlet temperature 70° C.) using ethanol (95%), thereby obtaining 40.9 g of a product having a pale ivory color close to white (yield: 67.8%, ascorbic acid content: 48.84%). $\{[Zn_3(OH)_3]^B[Zn_1(OH)_1]^S\}\{(ascorbic\ acid)_2\}\cdot 2(H_2O)$ Analysis Method and Evaluation Criterion In order to confirm the structure of the multilayered metal hydroxide, analysis was performed with the following analyzer.

Analysis Method 1: Powder-X-Ray Diffraction Pattern
  Instrument: Powder X-ray Diffraction (PXRD) X-ray diffractometer (D/MAXPRINT 2200-Ultima, Rigaku, Japan)
  Cu-Kα radiation (λ=1.5418 Å)
  Tube voltage: 40 kV, current: 30 mA
  As an X-ray diffractometer, a D/MAXPRINT 2200-Ultima available from Rigaku (Japan) was used. The anode generating X-rays was formed of Cu metal, and measurement was performed using Kα rays (λ=1.5418 Å) at 2θ of 3 to 70° a scanning speed of 0.02°/0.2 sec, and a divergence slit, scattering slit, and receiving slit of 0.1, 1, and 1 mm, respectively. The tube voltage was 40 kV, and the current was 30 mA.

Evaluation Criterion 1

The one-dimensional (1D) electron density for the z axis of PXRD (Powder X-ray Diffraction) is calculated using Equation 2 below.

$$\rho(Z) = \sum_{l=0}^{\infty} F_{00l} \cos \frac{2\pi l z}{c} \quad \text{[Equation 2]}$$

The powder obtained through synthesis was comparatively analyzed using an XRD pattern, and the interlayer distance was calculated using Bragg's equation (Equation 3 below). As for the foremost located peak, it represents the interlayer distance including the distance of the synthesized metal hydroxide layer and the anionic layer, which is regarded as a main interlayer distance.

$$n\lambda = 2d \sin\theta \quad \text{[Equation 3]}$$

(λ=X-ray wavelength, d=crystal lattice spacing, θ=incident angle)

Analysis Method 2: HPLC Analysis
  Instrument: High-performance liquid chromatography (HPLC) analysis Agilent 1100 series (Agilent Technologies, USA)
  UV detector ($\lambda_{max}$=240)
  Zorbax C18 column (4.6 mm×150 mm, 5 μm, Agilent Technologies, USA)
  Flow rate: 0.65 ml/min
  Injection volume: 10 μl
  Column temperature: 35° C.

For HPLC analysis, an Agilent 1100 series (Agilent Technologies, USA) was used. $\lambda_{max}$ was measured at 240 nm, and measurement was performed using a Zorbax C18 column (4.6 mm×150 mm, 5 μm Agilent Technologies, USA) under conditions of 0.65 ml/min, an injection volume of 10 μl, and a column temperature of 35° C.

A mobile-phase buffer includes 0.1% trifluoroacetic acid (ReagentPlus®, 99%) and uses a solution of acetonitrile (anhydrous, 99.8%) and deionized water at a volume ratio of 2:8.

For sample treatment, 40 mg of a sample was mixed with 100 ml of a buffer solvent, sonicated for 10 min, and then rapidly stirred for 10 min. The resulting solution was filtered using a nylon syringe filter (pore size of 0.2 μm), and thus the sample was measured.

Experimental Example 1

The graph analyzed through the above analysis method is shown in FIG. 1 and in Table 1 below.

Method of Preparing Reference ($Zn_5(OH)_8$(ascorbic acid)$_2\cdot 2H_2O$)

6 g of $Zn(NO_3)_2\cdot H_2O$ and 1.42 g of vitamin C were dissolved in deionized water not containing carbonate ions ($CO_3^{2-}$), titrated to a pH of about 6 to 7 using 0.2 M NaOH, and then allowed to react for 12 hr, thus obtaining a vitamin C-zinc basic salt precipitate. The solution thus titrated was subjected to centrifugation to separate a supernatant and washing six times, thus removing unreacted salts and vitamin C, thereby obtaining 2.9 g (yield: 65%, and vitamin C content: 39%).

Method of Preparing MZLA $\{[Zn_3(OH)_4]^B[Zn_1(OH)_2]^S\}\{(ascorbic\ acid)_2\}\cdot 3(H_2O)$ MZLA of the present invention was prepared in the same manner as in Synthesis Example 2.

Method of Preparing Zinc Basic Salt ($Zn_5(OH)_8(NO_3)_2\cdot 2H_2O$)

5 g of $Zn(NO_3)_2\cdot 6H_2O$ was dissolved in deionized water not containing carbonate ions ($CO_3^{2-}$) and then titrated to a pH of about 6 to 7 using 0.2 M NaOH, thus obtaining a zinc basic salt precipitate. The solution thus titrated was subjected to centrifugation and washing, thus removing unreacted salts, thereby obtaining 2.6 g of a white powder (yield: 70%).

TABLE 1

Table. Powder XRD patterns corresponding the basal spacing.

| Sample | 2 theta (degree) | d-value (Å) |
|---|---|---|
| REFERENCE (b) | 6.02 | 14.67 |
| MZLA(sample) (a) | 5.96 | 14.82 |
|  | 8.5 | 10.40 |
|  | 10.36 | 8.53 |
| Zinc basic salt(c) | 9 | 9.82 |

As shown in the XRD pattern of FIG. 1, the change in physical structure of the metal coordination site in the metal sheet appears as a change in basal area unit charge, and the number, size, bonding strength, and orientation of ascorbate are determined by physical properties such as steric hindrance, electron density, ion-dipole moment, etc. of ascorbate coupled with the metal layer within the layer sheet to afford the interlayer height.

The interlayer distances of metal hydroxide (MZLA) in the present experiment were 14.82 Å, 10.4 Å and 8.53 Å at 5.96°, 8.5° and 10.36°, respectively. The d-value values of the three peak positions located at 15° or less were different from each other, and considering the ratio of the stacking order of the interlayer distance equation (Bragg's equation) to the c-axis, different types of stacking were made. This is because a different base layer (basal spacing) was formed for (0,0,l) reflection, and individual peaks were generated from different structures. Moreover, considering the layer thickness (brucite layer thickness, 7.4 Å) and ascorbate ion length (4.9 Å), the peak near 8.5° (10.394 Å) was further decreased by about 4.4 Å compared to 5.96°, and the peak near 10.36° (8.6419 Å) was decreased by 6.29 Å and appeared smaller than the interlayer distance (9.82 Å) due to $NO^{3-}$ ions of ZBS, indicating that the metal coordination site formed by the metal layer and the ascorbate changed, resulting in a smaller interlayer distance.

The crystallinity of the peak representing the spacing of the layered structure when compared with a conventional hydroxide structure was increased, and a new peak was generated. The interlayer spacing of the conventional metal hydroxide was 14.67 Å, but a new peak was generated in MZLA (modified zinc layer ascorbate), and interlayer spacing of 14.81 Å, 10.39 Å, and 8.53 Å was calculated, resulting in a changed diffraction pattern and increased crystallinity.

Experimental Example 2: XRD Graph and Measurement of Vitamin C Content Depending on Ethanol and Water Content Examples 1 to 4

Example 1, Example 2, Example 3 and Example 4 were synthesized in the same manner as in Synthesis Example 1, Synthesis Example 2, Synthesis Example 3 and Synthesis Example 4, respectively, using the amounts shown in Table 2 below.

tallinity of the peak increased and a new diffraction pattern appeared, thus generating clear peaks near 8° and 10°.

Moreover, as the proportion of ethanol increased, the amount of ascorbate of metal hydroxide gradually increased to 44.24%, 45.19%, and 48.84%, and the color of the powder also showed a pale ivory color close to white.

Experimental Example 3: Analysis of Changes in XRD Depending on ① $EtOH:H_2O=85:15$ Ratio, ② $EtOH:H_2O=10:90$ Ratio, ③ $H_2O=100$ (Reference) and ④ $ZBS-NO_3$ The Zn site constituting the tetrahedral structure in the layered structure is in an unstable form with a positive charge and is reacted with the ionic molecule in order to balance the charge valance corresponding thereto, and the water molecule bound to the Zn site due to the dipole moment forms a metal layer through bonding with an anion using hydrogen bonding and ion-dipole interaction. Here, when using EtOH in a predetermined proportion or more, competition between solvent molecules having similar dipole moments promotes instability of water molecules binding to the Zn site, resulting in a change in the structural position of Zn constituting the tetrahedral structure in the ZBS layer. The ascorbate of ZBS-ascorbate is present through bonding of a water molecule bound to Zn and ascorbic acid (dehydration form), and the structural instability caused by ethanol affects the ascorbate bound to the water molecule.

Figure 3:
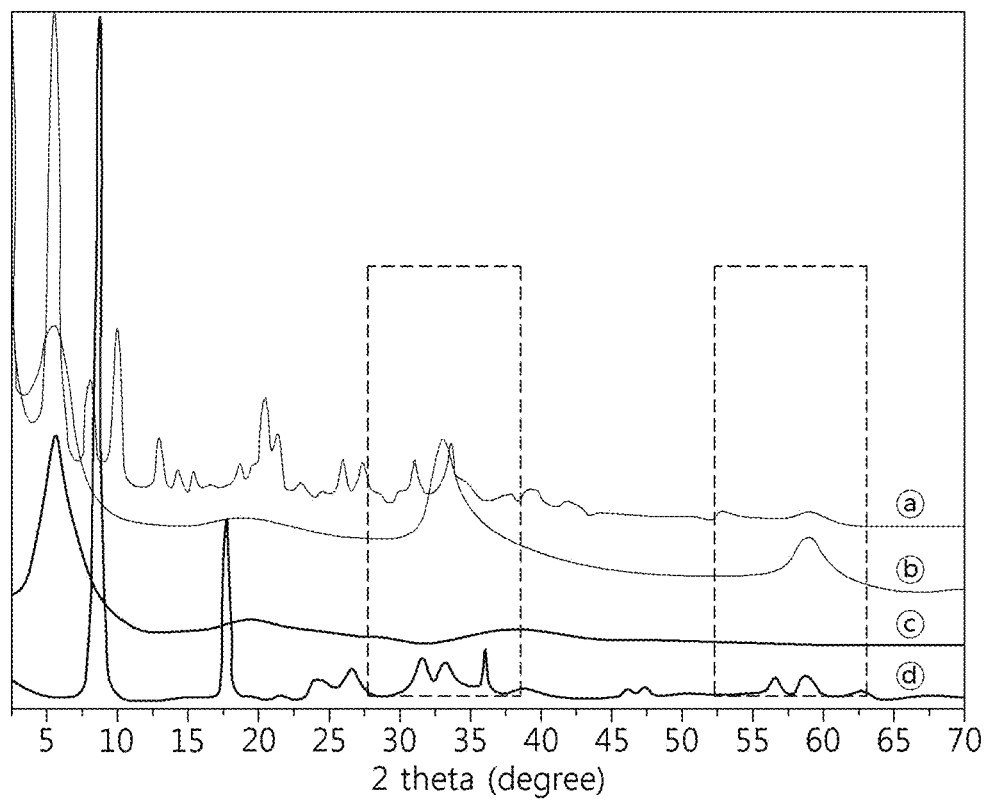
FIG. 3 is an XRD graph, in which ⓐ and ⓑ are XRD graphs of metal hydroxide using a mixed solvent of ethanol:water (ⓐ EtOH:$H_2O$=85:15, and ⓑ EtOH 4.6:$H_2O$ 5.4), ⓒ is an XRD graph of metal hydroxide using water alone as a solvent, and ⓓ is an XRD graph of ZBS-$NO_3$.

This tendency was confirmed in FIG. 3, and for the same reason as described above, in order to maintain a structurally stable form when using ethanol in a predetermined proportion, a nanosheet-like twisted asymmetric layered structure (turbostatic structure) was formed, and thus peaks near 33° and 58° appeared in broad humped forms (ⓑ). As the amount of ethanol increased, the position of anions in the

TABLE 2

|  | material | MW | eq. | Example 1 ⓐ EtOH 1.0:H2O 9.0 | | Example 2 ⓑ EtOH 4.6:H2O 5.4 | | Example 3 ⓒ EtOH 6.4:H2O 3.6 | | Example 4 ⓓ EtOH 8.5:H2O 1.5 | |
| --- | --- | --- | --- | --- | --- | --- | --- | --- | --- | --- | --- |
|  |  |  |  | usage (g) | mole | usage (g) | mole | usage (g) | mole | usage (g) | mole |
| 1st | ZnO | 81.38 | standard | 30 | 0.036864 | 30 | 0.036864 | 3 | 0.036864 | 30 | 0.036864 |
|  | HCl | 36.46 | 2.2 eq |  | 0.082282 |  | 0.082282 | 3 | 0.082282 |  | 0.082282 |
|  | (conc. HCl) |  |  | 68.5 ml |  | 68.5 ml |  | 68.5 ml |  | 68.5 ml |  |
|  | solvent EtOH |  |  | 0 |  | 628 |  | 943 |  | 1129 |  |
|  | H2O |  |  | 1197 |  | 549 |  | 254 |  | 68 |  |
|  | subtotal |  | 24 v | 1197 ml |  | 1197 ml |  | 1197 ml |  | 1197 ml |  |
| 2nd | ascorbic acid | 176.16 | 0.4 eq | 26 | 0.014759 | 26 | 0.014759 | 26 | 0.014759 | 26 | 0.014759 |
|  | solvent EtOH |  |  | 175 |  | 175 |  | 175 |  | 355 |  |
|  | H2O |  |  | 230 |  | 230 |  | 230 |  | 50 |  |
|  | subtotal |  | 16.7 v | 405 ml |  | 405 ml |  | 405 ml |  | 405 ml |  |
| 3rd | 5N NaOH |  |  | 144 ml |  | 144 ml |  | 144 ml |  | 144 ml |  |
| result | yield (g) |  |  | 35.4 |  | 37.6 |  | 39.5 |  | 40.9 |  |
|  | yield (%) |  |  |  | 58.8 |  | 62.4 |  | 65.6 |  | 67.8 |
|  | Shape |  |  | pale beige powder |  | pale ivory Powder |  | pale ivory powder |  | pale ivory powder |  |
|  | ascorbic acid (%) |  |  |  | 42.24 |  | 45.19 |  | 46.35 |  | 48.84 |

Figure 2:
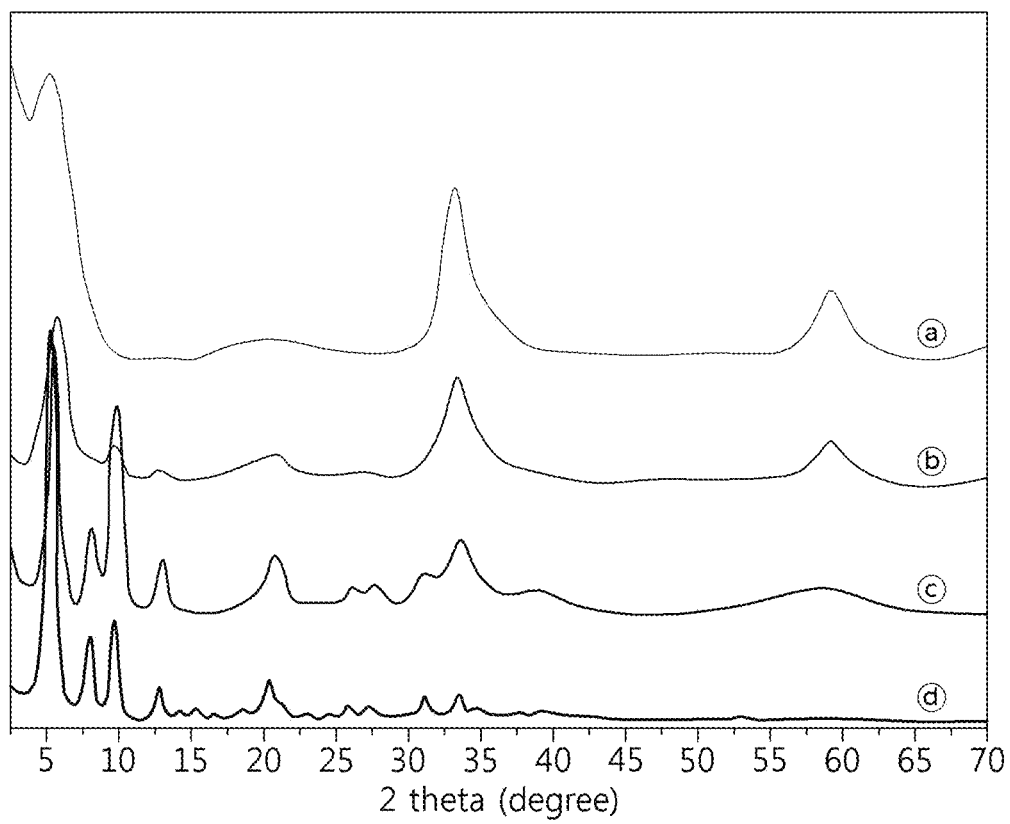
FIG. 2 is an XRD graph of metal hydroxide depending on the ratio of ethanol:water solvent, in which, when the sum of the weight ratio of EtOH and $H_2O$ is 10, ⓐ is a graph at EtOH 1.0:$H_2O$ 9.0, ⓑ is a graph at EtOH 4.6:$H_2O$ 5.4, ⓒ is a graph at EtOH 6.4:$H_2O$ 3.6 and ⓓ is a graph at EtOH 8.5:$H_2O$ 1.5.

As shown in Table 2 and FIG. 2, the peak crystallinity changed and the interlayer spacing varied depending on the ratio of ethanol to deionized water upon synthesis. When the proportion of ethanol was low (Example 1, (a)), the diffraction pattern of ascorbate broadly appeared near 5 to 6°, and as the proportion of ethanol gradually increased, the cryslayer sheet changed so as to maintain a more structurally stable form, and the peaks representing the layer distance of 15° or less appeared and changed. Moreover, as an asymmetric structure disappeared, the peaks near 33° and 58° disappeared, and a multilayer-type layered structure (ⓐ) appeared.

The asymmetric layered structure (turbostatic structure) of the diffraction pattern at 30°<θ<40° and 55°<θ<65° is not found in ZBS-NO₃ (ⓓ), but is found in structures containing other anions in ZBS. In the case of conventional ZBS-ascorbic acid, it does not appear as in ⓒ of FIG. 3, but it is a physical phenomenon artificially created by the control of the proportion of EtOH, showing a structure and form different from the XRD peaks indicated by the reference.

Experimental Example 4: Scanning Electron Microscopy of Metal Hydroxide of Synthesis Example 2

Figure 8:
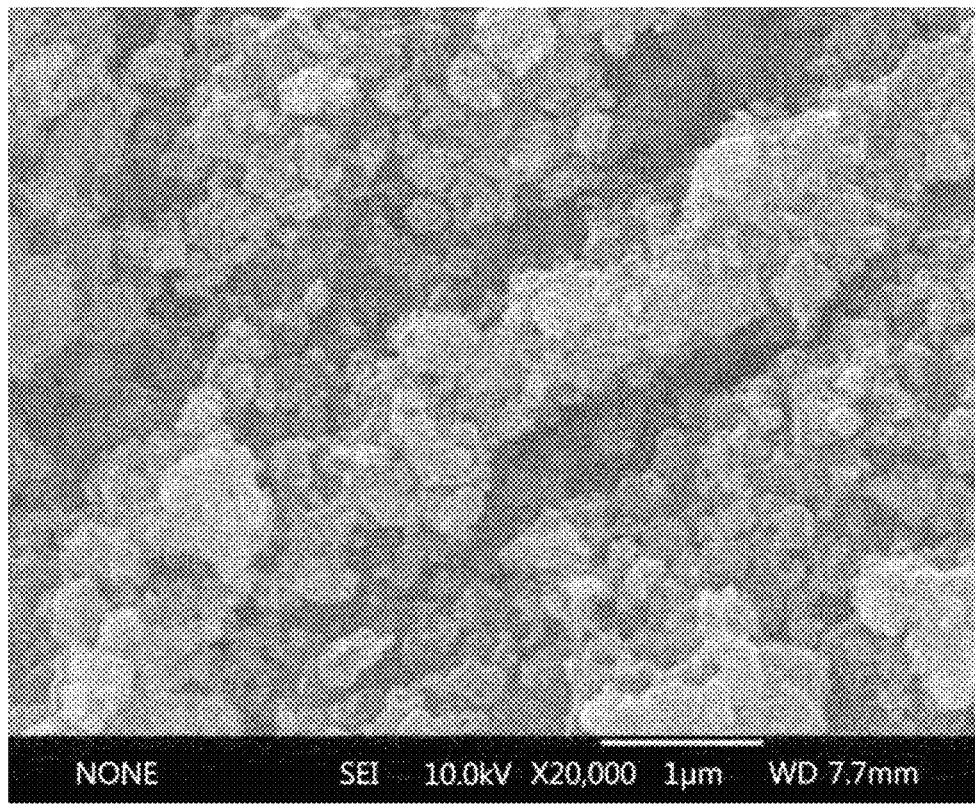
FIG. 8 shows an SEM image of metal hydroxide depending on the ratio of ethanol:water solvent, which is an enlarged image of a portion of the surface of single particles.
Figure 9:
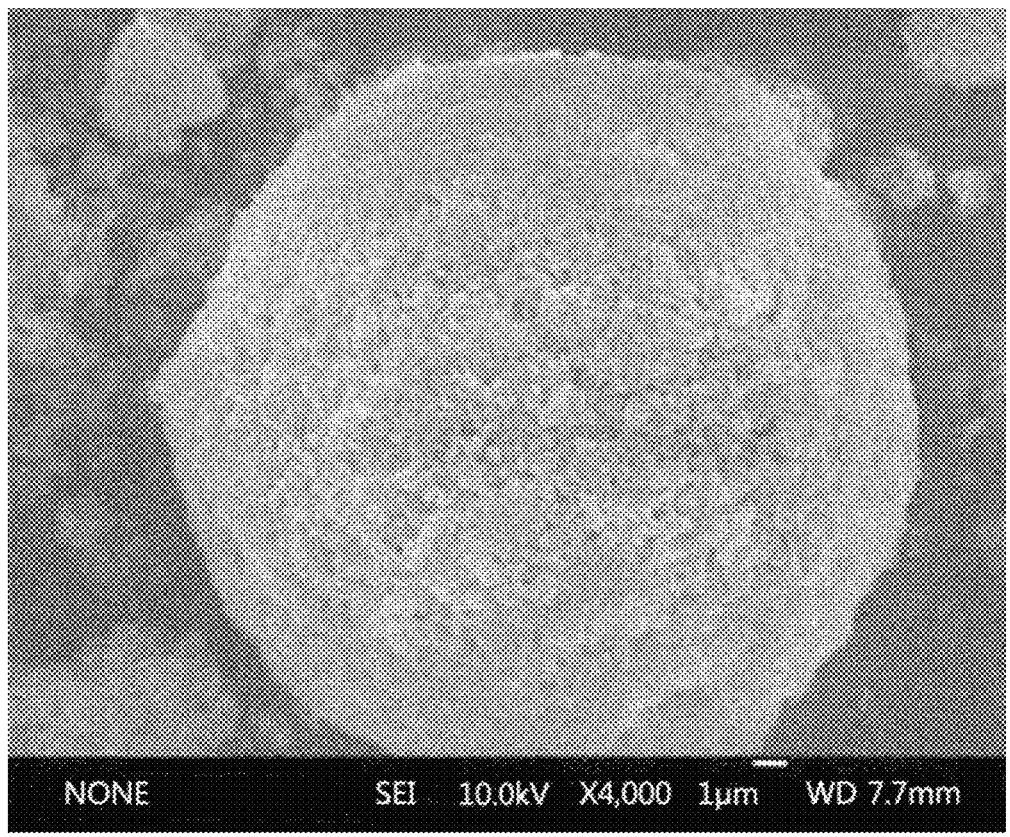
FIG. 9 shows an SEM image of metal hydroxide depending on the ratio of ethanol:water solvent.
Figure 10:
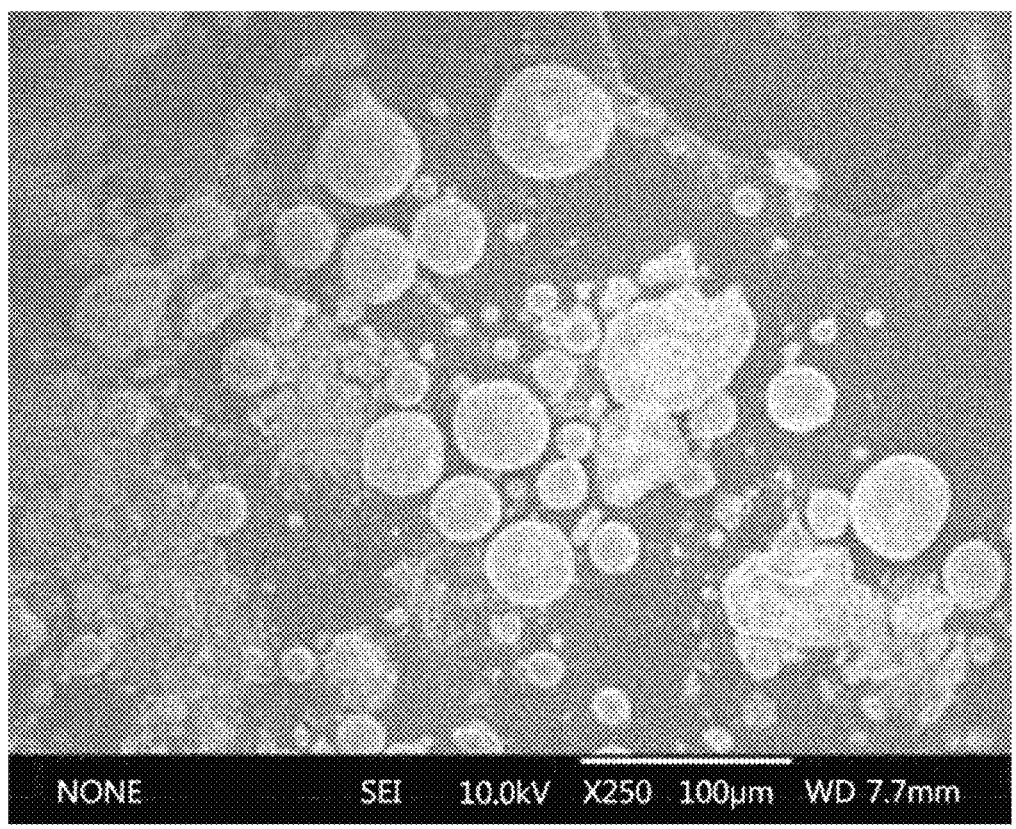
FIG. 10 shows an SEM image of metal hydroxide depending on the ratio of ethanol:water solvent.

FIGS. 8 to 10 are scanning electron microscope (SEM) images of the metal hydroxide prepared in Synthesis Example 2. The metal hydroxide had an average particle size of 10 to 20 μm and a spherical shape. The size thereof differed from that of the reference, and it is known that the reference has a size of about 200 to 300 nm or 0.5 μm or less.

Experimental Example 5: XRD Graph and Measurement of Vitamin C Content Depending on Ethanol and Water Content Examples 5 to 7

Example 5, Example 6 and Example 7 were performed in the same manner as in Synthesis Example 2, Synthesis Example 3 and Synthesis Example 4, respectively, with the exception that the amounts shown in Table 3 below were applied.

Figure 4:
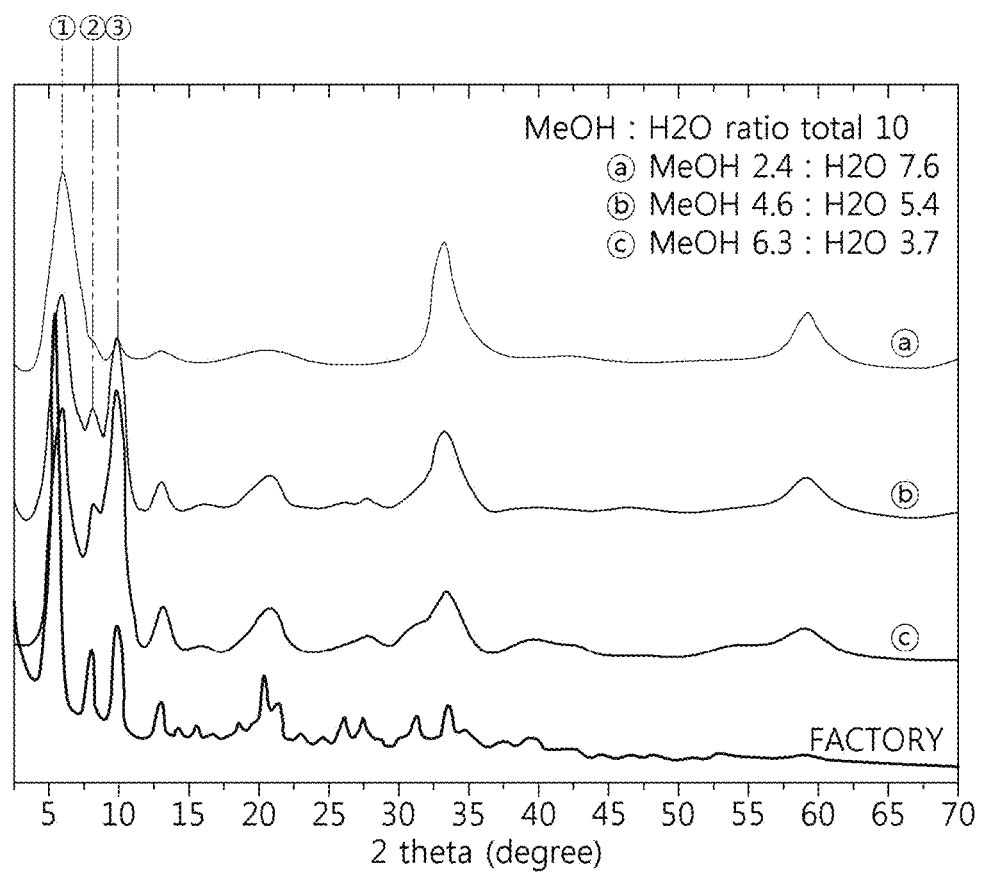
FIG. 4 shows an XRD graph of metal hydroxide depending on the ratio of methanol:water solvent.

The specific XRD values of Examples 5 to 7 are shown in FIG. 4.

TABLE 3

| | material | MW | eq. | Example 5 usage (g) | Example 5 mole | Example 6 usage (g) | Example 6 mole | Example 7 usage (g) | Example 7 mole |
|---|---|---|---|---|---|---|---|---|---|
| 1st | ZnO | 81.38 | standard | 3 | 0.036864 | 3 | 0.036864 | 3 | 0.036864 |
| | HCl | 36.46 | 2.2 eq | 3 | 0.082282 | 3 | 0.082282 | 3 | 0.082282 |
| | (conc. HCl) | | | 6.85 ml | | 6.85 ml | | 6.85 ml | |
| | solvent EtOH | | | 0 | | 36 | | 64 | |
| | H2O | | | 72 | | 36 | | 8 | |
| | subtotal | | 24 v | 72 ml | | 72 ml | | 72 ml | |
| 2nd | ascorbic acid | 176.16 | 0.4 eq | 2.6 | 0.014759 | 2.6 | 0.014759 | 2.6 | 0.014759 |
| | solvent EtOH | | | 40 | | 40 | | 40 | |
| | H2O | | | 10 | | 10 | | 10 | |
| | subtotal | | 16.7 v | 50 ml | | 50 ml | | 50 ml | |
| 3rd | 1.6N NaOH | | | 45 ml | | 45 ml | | 42 ml | |
| Final result | Vitabrid C | 815.26 | 0.2 eq | 6.01 | 0.007372 | 6.01 | 007372 | 6.01 | 0.007372 |
| | yield (g) | | | 3.5 | | 3.73 | | 3.87 | |
| | yield (%) | | | 58.8 | | 62.3 | | 65.5 | |
| | shape | | | pale ivory Powder | | pale ivory Powder | | pale ivory powder | |
| | ascorbic acid (%) | | | 43.68 | | 45.23 | | 46.1 | |
| | solvent (ml) | | EtOH | 40 | | 76 | | 106 | |
| | | | H2O | 127 | | 91 | | 60 | |
| | EtOH/H2O | | | 0.31 | | 0.84 | | 1.77 | |
| | ratio | | EtOH | 0.24 | | 0.46 | | 0.64 | |
| | | | H2O | 0.76 | | 0.54 | | 0.36 | |
| | subtotal | | | 173.85 | | 173.85 | | 170.85 | |
| | Solvent volume/ZnO | | | 55.7 | | 55.7 | | 55.3 | |
| | ZnO % in solvent | | | 1.80 | | 1.80 | | 1.81 | |

Experimental Example 6: XRD Graph and Measurement of Vitamin C Content Depending on Methanol and Water Content Examples 8 to 10

Example 8, Example 9 and Example 10 were performed in the same manner as in Synthesis Example 2, Synthesis Example 3 and Synthesis Example 4, respectively, with the exception that methanol was used in lieu of ethanol and the amounts shown in Table 4 below were applied.

Figure 5:
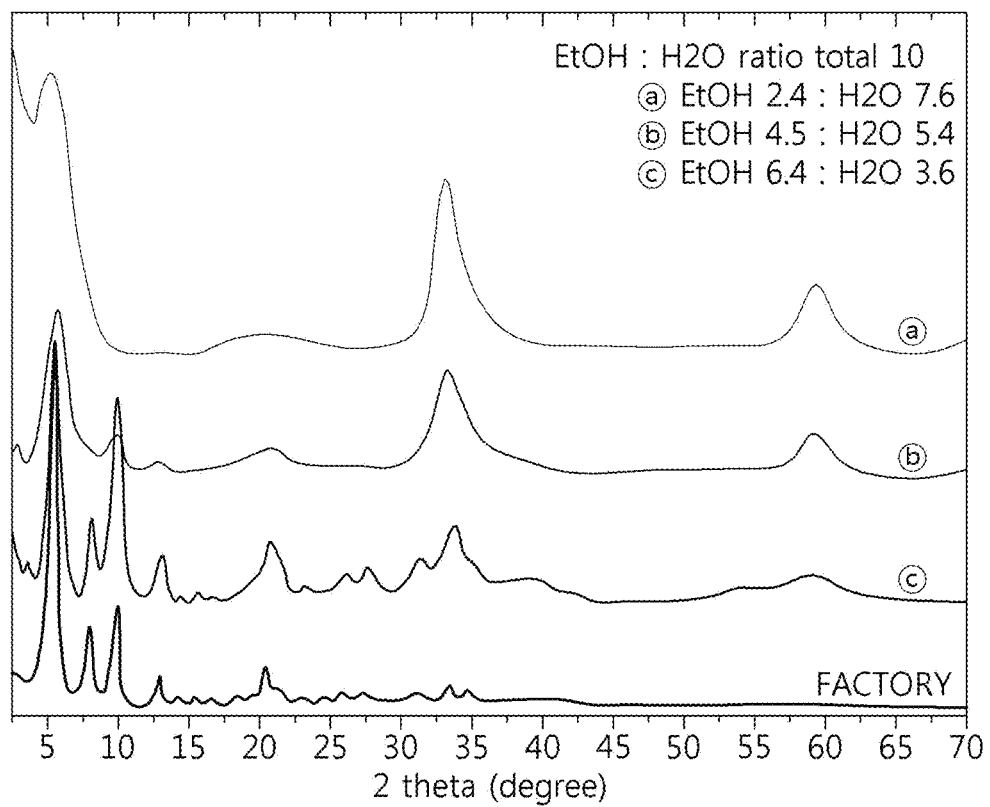
FIG. 5 shows an XRD graph of metal hydroxide depending on the ratio of ethanol:water solvent.

The specific XRD values of Examples 8 to 10 are shown in FIG. 5 and in Table 5 below.

TABLE 4

| | material | MW | eq. | Example 8 usage (g) | Example 8 mole | Example 9 usage (g) | Example 9 mole | Example 10 usage (g) | Example 10 mole |
|---|---|---|---|---|---|---|---|---|---|
| 1st | ZnO | 81.38 | standard | 3 | 0.036864 | 3 | 0.036864 | 3 | 0.036864 |
| | HCl | 36.46 | 2.2 eq | 3 | 0.082282 | 3 | 0.082282 | 3 | 0.082282 |

TABLE 4-continued

|  | material |  | MW | eq. | Example 8 usage (g) | Example 8 mole | Example 9 usage (g) | Example 9 mole | Example 10 usage (g) | Example 10 mole |
|---|---|---|---|---|---|---|---|---|---|---|
|  | (conc. HCl) |  |  |  | 6.85 ml |  | 6.85 ml |  | 6.85 ml |  |
|  | solvent | MeOH |  |  | 0 |  | 36 |  | 64 |  |
|  |  | H2O |  |  | 72 |  | 36 |  | 8 |  |
|  |  | Subtotal |  | 24 v | 72 ml |  | 72 ml |  | 72 ml |  |
| 2nd | ascorbic acid |  | 176.16 | 0.4 eq | 2.6 | 0.014759 | 2.6 | 0.014759 | 2.6 | 0.014759 |
|  | solvent | MeOH |  |  | 40 |  | 40 |  | 40 |  |
|  |  | H2O |  |  | 10 |  | 10 |  | 10 |  |
|  |  | subtotal |  | 16.7 v | 50 ml |  | 50 ml |  | 50 ml |  |
| 3rd | 1.6N NaOH |  |  |  | 45 ml |  | 45 ml |  | 42 ml |  |
| Final | Vitabrid C |  | 815.26 | 0.2 eq | 6.01 | 0.007372 | 6.01 | 007372 | 6.01 | 0.007372 |
| result | yield (g) |  |  |  | 4.4 |  | 4.5 |  | 4.57 |  |
|  | yield (%) |  |  |  | 70.1 |  | 71.7 |  | 72.8 |  |
|  | shape |  |  |  | pale yellow powder |  | pale yellow powder |  | pale yellow powder |  |
|  | ascorbic acid (%) |  |  |  | 40.79 |  | 46.11 |  | 50.97 |  |
|  | solvent | MeOH |  |  | 40 |  | 76 |  | 104 |  |
|  | (ml) | H2O |  |  | 127 |  | 91 |  | 60 |  |
|  | MeOH/H2O |  |  |  | 0.31 |  | 0.84 |  | 1.73 |  |
|  | ratio | MeOH |  |  | 0.24 |  | 0.46 |  | 0.63 |  |
|  |  | H2O |  |  | 0.76 |  | 0.54 |  | 0.37 |  |
|  | subtotal |  |  |  | 167 |  | 167 |  | 166 |  |
|  | Solvent volume/ZnO |  |  |  | 55.7 |  | 55.7 |  | 55.3 |  |
|  | ZnO % in solvent |  |  |  | 1.80 |  | 1.80 |  | 1.80 |  |

TABLE 5

| Example 8 (a) | 6.48 33.42 59.3 |
| Example 9 (b) | 6.34 8.56 10.4 13.52 21.14 28.2 33.52 59.08 |
| Example 10 (c) | 6.28 8.62 10.28 13.42 21 28.06 33.5 59.16 |

Experimental Example 7: XRD Graph and Measurement of Vitamin C Content Depending on Propanol and Water Content Examples 11 to 13

Example 11, Example 12 and Example 13 were performed in the same manner as in Synthesis Example 2, Synthesis Example 3 and Synthesis Example 4, respectively, with the exception that n-propanol was used in lieu of ethanol and the amounts shown in Table 6 below were applied.

Figure 6:
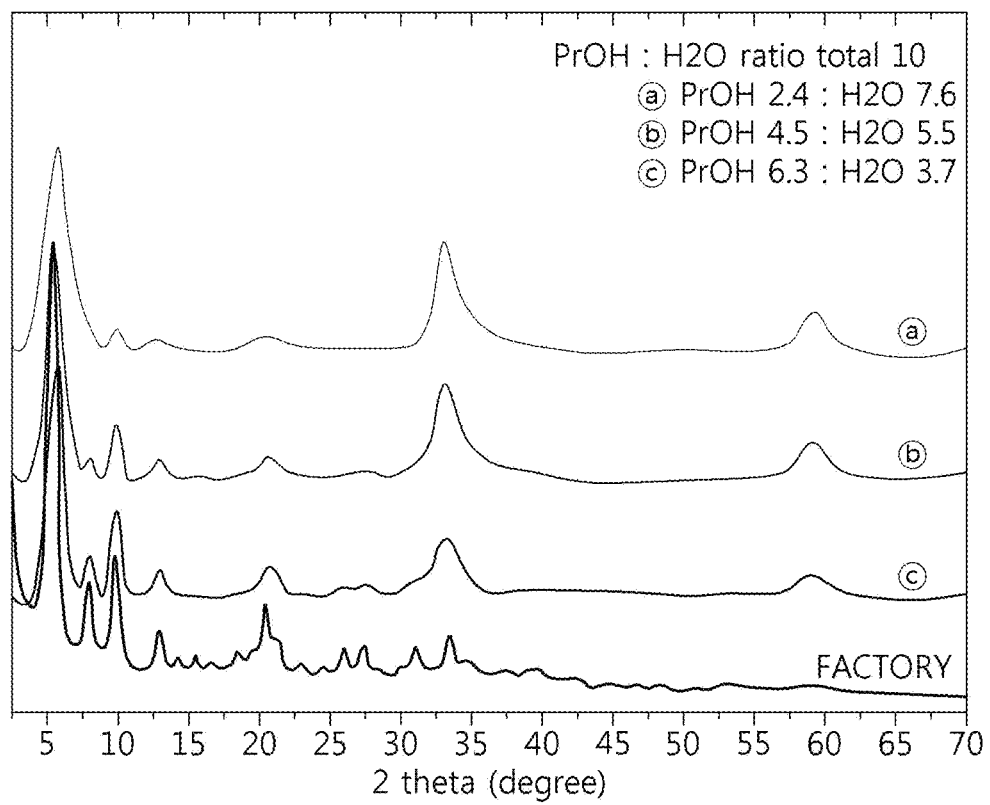
FIG. 6 shows an XRD graph of metal hydroxide depending on the ratio of propanol:water solvent.

The specific XRD values of Examples 11 to 13 are shown in FIG. 6.

TABLE 6

|  | material |  | MW | eq. | Example 11 usage (g) | Example 11 mole | Example 12 usage (g) | Example 12 mole | Example 13 usage (g) | Example 13 mole |
|---|---|---|---|---|---|---|---|---|---|---|
| 1st | ZnO |  | 81.38 | standard | 3 | 0.036864 | 3 | 0.036864 | 3 | 0.036864 |
|  | HCl |  | 36.46 | 2.2 eq | 3 | 0.082282 | 3 | 0.082282 | 3 | 0.082282 |
|  | (conc. HCl) |  |  |  | 6.85 ml |  | 6.85 ml |  | 6.85 ml |  |
|  | solvent | PrOH |  |  | 0 |  | 36 |  | 64 |  |
|  |  | H2O |  |  | 72 |  | 36 |  | 8 |  |
|  |  | Subtotal |  | 24 v | 72 ml |  | 72 ml |  | 72 ml |  |
| 2nd | ascorbic acid |  | 176.16 | 0.4 eq | 2.6 | 0.014759 | 2.6 | 0.014759 | 2.6 | 0.014759 |
|  | solvent | PrOH |  |  | 40 |  | 40 |  | 40 |  |
|  |  | H2O |  |  | 10 |  | 10 |  | 10 |  |
|  |  | subtotal |  | 16.7 v | 50 ml |  | 50 ml |  | 50 ml |  |

TABLE 6-continued

|  | material | MW | eq. | Example 11 usage (g) | Example 11 mole | Example 12 usage (g) | Example 12 mole | Example 13 usage (g) | Example 13 mole |
|---|---|---|---|---|---|---|---|---|---|
| 3rd | 1.6N NaOH |  |  | 47 ml |  | 47 ml |  | 44 ml |  |
| Final | Vitabrid C | 815.26 | 0.2 eq | 6.01 | 0.007372 | 6.01 | 007372 | 6.01 | 0.007372 |
| result | yield (g) |  |  | 4.46 |  | 4.71 |  | 4.57 |  |
|  | yield (%) |  |  | 71.06 |  | 75.04 |  | 72.8 |  |
|  | shape |  |  | pale yellow powder |  | pale yellow powder |  | pale yellow powder |  |
|  | ascorbic acid (%) |  |  | 17.69 |  | 18.16 |  | 20.47 |  |

|  | solvent (ml) | PrOH | 40 | 76 | 104 |
|---|---|---|---|---|---|
|  |  | H2O | 129 | 93 | 62 |
|  | PrOH/H2O |  | 0.31 | 0.82 | 1.68 |
|  | ratio | PrOH | 0.24 | 0.45 | 0.63 |
|  |  | H2O | 0.76 | 0.55 | 0.37 |
|  | subtotal |  | 167 | 167 | 166 |
|  | Solvent volume/ZnO |  | 55.7 | 55.7 | 55.3 |
|  | ZnO % in solvent |  | 1.80 | 1.80 | 1.80 |

TABLE 7

| Example 11 (a) | 6.04 10.38 13.2 20.78 33.38 59.2 |
|---|---|
| Example 12 (b) | 6.12 8.44 10.38 13.36 21.06 26.4 27.88 33.46 59.24 |
| Example 13 (c) | 6.02 8.54 10.38 13.32 20.96 26.5 27.88 33.56 59.1 |

Experimental Example 8: XRD Graph and Measurement of Vitamin C Content Depending on Butanol and Water Content Examples 14 to 17

Example 14, Example 15 and Example 16 were performed in the same manner as in Synthesis Example 2, Synthesis Example 3 and Synthesis Example 4, respectively, with the exception that n-butanol was used in lieu of ethanol and the amounts shown in Table 8 below were applied.

Figure 7:
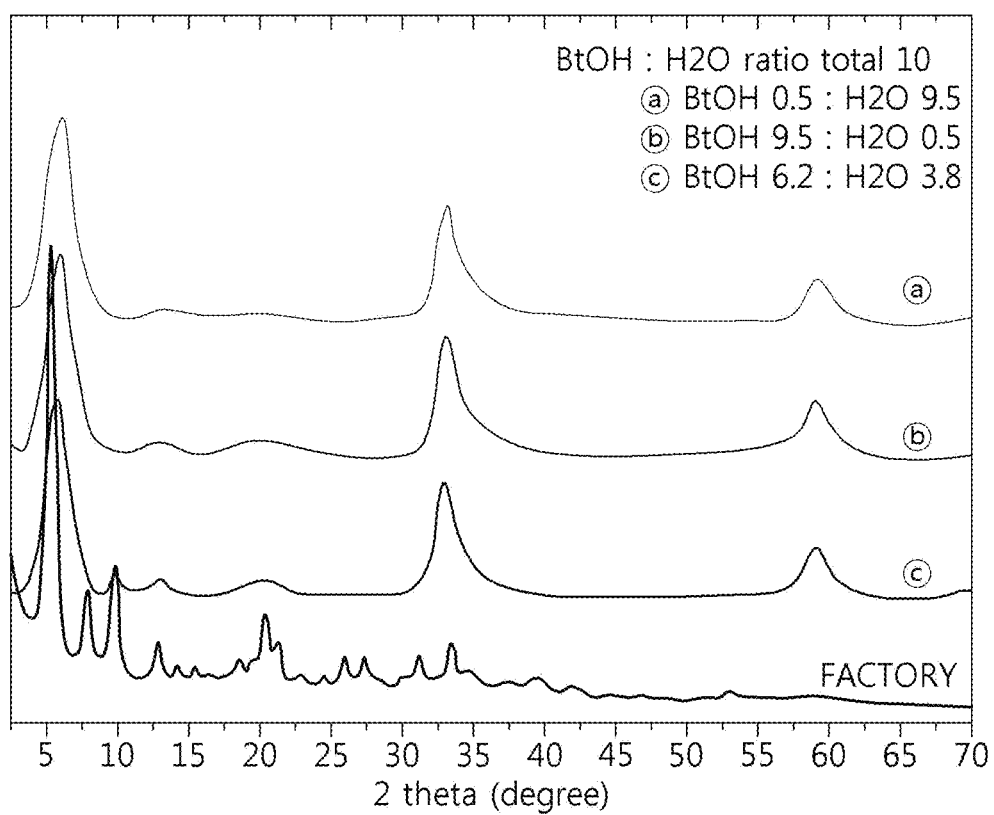
FIG. 7 shows an XRD graph of metal hydroxide depending on the ratio of butanol:water solvent.

The specific XRD values of Examples 14 to 16 are shown in FIG. 7.

TABLE 8

|  | material |  | MW | eq. | Example 14 usage (g) | Example 14 mole | Example 15 usage (g) | Example 15 mole | Example 16 usage (g) | Example 16 mole |
|---|---|---|---|---|---|---|---|---|---|---|
| 1st | ZnO |  | 81.38 | standard | 3 | 0.036864 | 3 | 0.036864 | 3 | 0.036864 |
|  | HCl |  | 36.46 | 2.2 eq | 3 | 0.082282 | 3 | 0.082282 | 3 | 0.082282 |
|  | (conc. HCl) |  |  |  | 6.85 ml |  | 6.85 ml |  | 6.85 ml |  |
|  | solvent | BtOH |  |  | 0 |  | 36 |  | 64 |  |
|  |  | H2O |  |  | 72 |  | 36 |  | 8 |  |
|  | Subtotal |  |  | 24 v | 72 ml |  | 72 ml |  | 72 ml |  |
| 2nd | ascorbic acid |  | 176.16 | 0.4 eq | 2.6 | 0.014759 | 2.6 | 0.014759 | 2.6 | 0.014759 |
|  | solvent | BtOH |  |  | 40 |  | 40 |  | 40 |  |
|  |  | H2O |  |  | 10 |  | 10 |  | 10 |  |
|  | subtotal |  |  | 16.7 v | 50 ml |  | 50 ml |  | 50 ml |  |
| 3rd | 1.6N NaOH |  |  |  | 45 ml |  | 45 ml |  | 45 ml |  |
| Final | Vitabrid C |  | 815.26 | 0.2 eq | 6.01 | 0.007372 | 6.01 | 007372 | 6.01 | 0.007372 |
| result | yield (g) |  |  |  | 4.1 |  | 4.01 |  | 4.38 |  |
|  | yield (%) |  |  |  | 65.3 |  | 63.9 |  | 69.8 |  |
|  | shape |  |  |  | yellow powder |  | yellow powder |  | yellow powder |  |
|  | ascorbic acid (%) |  |  |  | 38.71 |  | 38.71 |  | 39.81 |  |

|  | solvent (ml) | BtOH | 40 | 76 | 104 |
|---|---|---|---|---|---|
|  |  | H2O | 127 | 91 | 63 |

TABLE 8-continued

| material | MW | eq. | Example 14 usage (g) | mole | Example 15 usage (g) | mole | Example 16 usage (g) | mole |
|---|---|---|---|---|---|---|---|---|
| BtOH/H2O | | | | 0.31 | | 0.84 | | 1.68 |
| ratio | | BtOH | | 0.24 | | 0.46 | | 0.62 |
| | | H2O | | 0.76 | | 0.54 | | 0.38 |
| subtotal | | | | 167 | | 167 | | 166 |
| Solvent volume/ZnO | | | | 55.7 | | 55.7 | | 55.3 |
| ZnO % in solvent | | | | 1.80 | | 1.80 | | 1.80 |

TABLE 9

| Example 11 (a) | 6.5 13.54 20.42 33.44 59.22 |
| Example 12 (b) | 6.4 13.5 20.92 33.32 59.22 |
| Example 13 (c) | 6.38 10.44 13.4 20.94 33.4 59.24 |

Experimental Example 9: Effect of Expression of Collagen of Example 3

Experimental Method

For the in-vitro collagen production increase test of Example 3 (hereinafter, referred to as "JL-101 powder"), normal human dermal fibroblasts (HDFs) were used. In order to set the test solution concentration of the sample, HDFs were treated with the sample material for 24 hr and the concentration range in which cytotoxicity was not observed was confirmed through a cytotoxicity test. HDFs were treated with 'JL-101 powder' at the set test solution concentration in the same manner, and thus the expression levels of COL1A1 and COL3A1 mRNA, which are collagen genes, were compared and analyzed using real-time PCR (RT-PCR).

Cell Line Selection and Cell Culturing

For the present test, normal human dermal fibroblasts (nHDFs; Lonza, Basel, Switzerland) were used. These cells were cultured in a 5% $CO_2$ incubator at 37° C. using a medium containing a fibroblast basal medium (cc-3181, Lonza, Walkersville, MD, USA) and FGM™-2 SingleQuots™ (hGFG, insulin, FBS and gentamicin/amphotericin-B; cc-4126, Lonza, Walkersville, MD, USA).

Test Material

As a test material, 'JL-101' was provided in the form of a powder, and was dissolved in a phosphate-buffered saline (PBS; Biosesang, Seongnam, Korea) and used for cell treatment. As a positive control, transforming growth factor beta (TGF-β; T7039, Sigma-Aldrich, MO, USA) was dissolved in PBS and used for cell treatment.

Test Material Concentration Setting

Human dermal fibroblasts were seeded at $4 \times 10^3$ cells/well in a 96-well plate, cultured for 24 hr, treated with an appropriate concentration of test material, and further cultured for 24 hr. Thereafter, the cells were treated with a WST-1 assay solution in 10% of the amount of the medium and additionally allowed to react at 37° C. for 0.5 to 1 hr, after which the absorbance thereof was measured at 450 nm using an iMark microplate reader (Bio-Rad, Hercules, CA, USA). The reference absorbance was measured at 650 nm to correct the result value. The result values are represented as mean±standard deviation based on three independent experiments. P<0.05 was verified through a Student's t-test to show the significance of the result value. The concentration range in which the cell viability due to the treatment with the test material did not decrease compared to the control based on the result values was set as the test solution concentration in the subsequent experiment.

Measurement of Expression Level of Collagen Gene

The expression level of a collagen gene was determined by measuring the expression levels of a COL1A1 gene, which is a representative component of type 1 collagen, and of a COL3A1 gene, which is a representative component of type 3 collagen, using quantitative real-time PCR (qRT-PCR) (Peter, 2008). Human dermal fibroblasts were seeded at $2 \times 10^5$ cells/well in a 6-well culture plate, cultured for 24 hr, treated with a predetermined concentration of test material, and then further cultured for 24 hr. The cultured cells were collected and lysed with 1 ml of a TRIzol reagent (Life Technologies) and total mRNA was extracted. The concentration and purity (A260/A280 and A260/A230 ratio) of total mRNA were measured using a MaestroNano® microvolume spectrophotometer (Maestrogen, Las Vegas, NV, USA), and only total mRNA having high purity of 2.0 or more was selected.

Total mRNA was replaced with cDNA using M-MLV reverse transcriptase (Life Technologies), and was used for qRT-PCR. qRT-PCR was performed using a HOT FIREPol EvaGreen PCR Mix Plus (Solis BioDyne, Estonia), and the expression of the corresponding gene was analyzed using Line-Gene K software (Bioer Technology Co. Ltd., Hangzhou, China). As a positive control for the collagen and collagenase mRNA content measurement test, TGF-β (Chung et al., 1997) was used. PCR was performed through denaturation at 94° C. for 5 min and 40 cycles of denaturation (94° C., 30 sec), annealing (60° C., 30 sec), and polymerization (72° C., 30 sec). The change in gene expression was measured by comparing with the expression level of the β-ACTIN control gene. The CT values of COL1A1 and COL3A1 were normalized to the CT value of β-ACTIN, and the relative expression levels of COL1A1 and COL3A1 were calculated through a 2-ΔΔCt method. The result values are represented as mean±standard deviation based on three independent experiments. P<0.05 was verified through a Student's t-test to show the significance of the result value. The information for primers used for qRT-PCR is shown in Table 10 below.

TABLE 10

| Gene | Forward primers | Reverse primers |
|---|---|---|
| COL1A1 | 5'-AGGGCCAAGACGAAGACATC-3' | 5'-AGATCACGTCATCGCACAACA-3' |
| COL3A1 | 5'-GTTTTGCCCCGTATTATGGA-3' | 5'-GGAAGTTCAGGATTGCCGTA-3' |
| β-ACTIN | 5'-GGATTCCTATGTGGGCGACGA-3' | 5'-CGCTCGGTGAGGATCTTCATG-3' |

| SEQ ID | GENE | SEQUENCE |
|---|---|---|
| SEQ ID 1 | COL1A1 Forward primers | 5'-AGGGCCAAGACGAAGACATC-3' |
| SEQ ID 2 | COL1A1 Reverse primers | 5'-AGATCACGTCATCGCACAACA-3' |
| SEQ ID 3 | COL3A1 Forward primers | 5'-GTTTTGCCCCGTATTATGGA-3' |
| SEQ ID 4 | COL3A1 Reverse primers | 5'-GGAAGTTCAGGATTGCCGTA-3' |
| SEQ ID 5 | β-ACTIN Forward primers | 5'-GGATTCCTATGTGGGCGACGA-3' |
| SEQ ID 6 | β-ACTIN Reverse primers | 5'-CGCTCGGTGAGGATCTTCATG-3' |

Setting of Test Solution Concentration of Test Material

Figure 12:
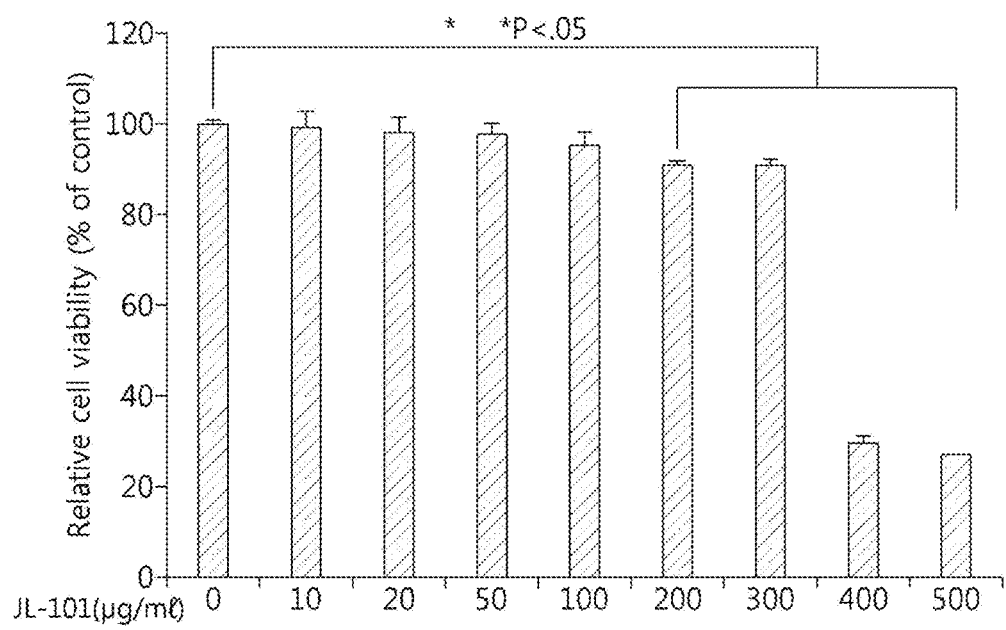
FIG. 12 shows the results of measurement of cell viability of human dermal fibroblasts treated with the metal hydroxide complex of the present invention, the horizontal axis representing the concentration of the treated sample material and the vertical axis representing cell viability.

The test solution concentration of 'JL-101 powder' as a test material was set using a WST-1 assay. Human dermal fibroblasts were treated for 24 hr with the 'JL-101 powder' material at a concentration ranging from 0 to 500 g/ml, and the cell viability thereof was measured using a WST-1 assay. The results thereof are shown in FIG. 12. The cell viability when the concentration of the 'JL-101 powder' material used for cell treatment was 100 μg/ml or less (10, 20, 50, and 100 μg/ml) did not exhibit a significant difference compared to the negative control. However, when the concentration thereof was 200 μg/ml or more (200, 300, 400, and 500 g/ml), the cell viability was decreased by 5% or more compared to the negative control. Therefore, in the subsequent efficacy test, the concentration of 100 μg/ml or less of the 'JL-101 powder' was set as the test solution concentration (FIG. 12).

Measurement of Expression Level of Type 1 Collagen mRNA

Figure 13:
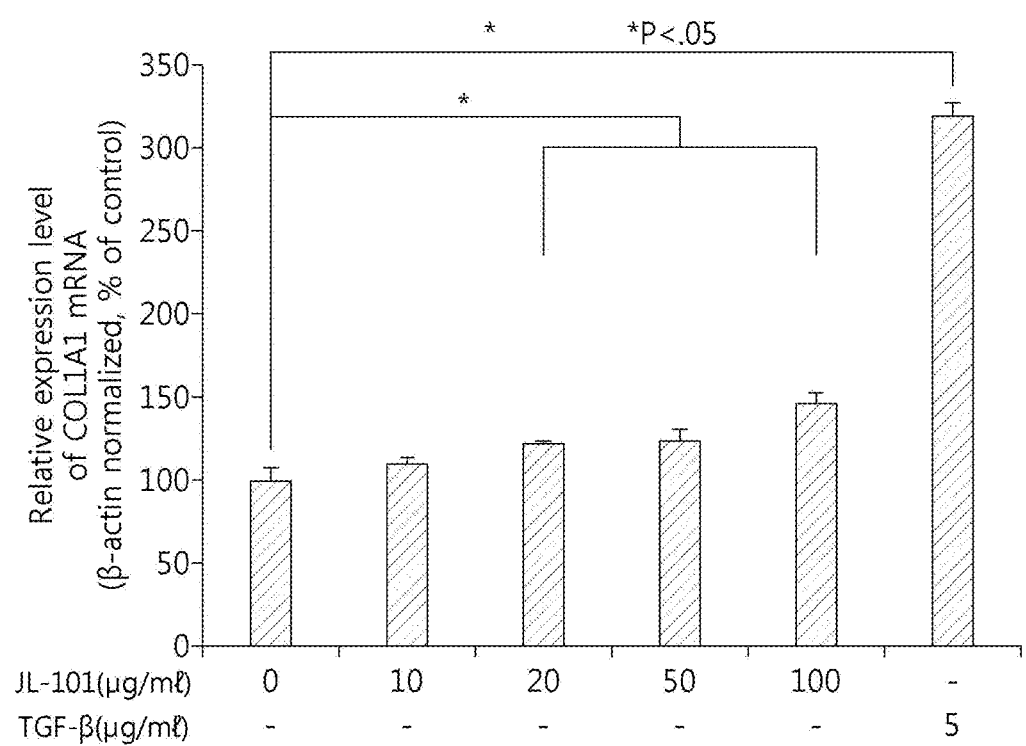
FIG. 13 shows changes in expression of type 1 collagen gene (COL1A1) of human dermal fibroblasts treated with the metal hydroxide complex of the present invention, the horizontal axis representing the concentration of the treated sample material and the vertical axis representing the expression level of COL1A1 mRNA.

Whether the expression of collagen in human dermal fibroblasts was increased or decreased through treatment with a test material 'JL-101 powder' was evaluated by measuring changes in the expression levels of COL1A1 mRNA and COL3A1 mRNA, which are type 1 collagen and type 3 collagen genes mainly present in the skin, and the extent of expression of COL1A1 mRNA through treatment with 'JL-101 powder' was first measured. Human dermal fibroblasts were treated with the test material 'JL-101 powder' at the maximum test solution concentration of 100 μg/ml or less (10, 20, 50, and 100 μg/ml), set through the above cytotoxicity test, and were then cultured for 24 hr, after which total RNA was extracted and cDNA was synthesized. Thereafter, the expression level of COL1A1 mRNA was measured through qRT-PCR using the COL1A1 primer set and the β-ACTIN primer set shown in Table 11. TGF-β was used as a positive control in order to improve the reliability of the test results. As shown in FIG. 13, the expression of COL1A1 mRNA was increased in a concentration-dependent manner upon treatment with 100 μg/ml or less of 'JL-101 powder'. In particular, the expression of COL1A1 mRNA upon treatment with 100 μg/ml was increased by 45.88±6.79% compared to the negative control. Based on the results of treatment with the positive control TGF-β (5.0 ng/ml), the expression of COL1A1 mRNA was increased by 219.65±7.25% compared to the negative control (FIG. 13).

Measurement of Expression Level of Type 3 Collagen mRNA

As shown in FIG. 14, the expression of COL3A1 mRNA upon treatment with 'JL-101 powder' was analyzed based on the analysis of expression of COL1A1 mRNA upon treatment with 'JL-101 powder'. Human dermal fibroblasts were treated with a test material 'JL-101 powder' in the test solution concentration range (10, 20, 50, and 100 μg/ml) set as in the above type 1 collagen mRNA expression level measurement test and were cultured for 24 hr, after which total RNA was extracted and cDNA was synthesized, and the expression level of COL3A1 mRNA was measured through qRT-PCR using the COL3A1 primer set and the β-ACTIN primer set shown in Table 1. TGF-β was used as a positive control in order to improve the reliability of the test results. As shown in FIG. 14, the expression of COL3A1 mRNA was increased in a concentration-dependent manner upon treatment with 0 to 100 μg/ml of 'JL-101 powder'. In particular, the expression of COL3A1 mRNA upon treatment with 100 μg/ml of 'JL-101 powder' was increased by 100.98±5.49% compared to the negative control. Based on the results of treatment with the positive control TGF-β (5.0 ng/ml), the expression of COL3A1 mRNA was increased by 22.93±6.21% compared to the negative control.

Measurement Results

The Korea Dermatology Research Institute conducted an efficacy test on the increase in the production of collagen in human dermal fibroblasts by the test material 'JL-101 powder', on request from C & Pharm.

Based on the results of analysis of viability of human dermal fibroblasts by the test material 'JL-101 powder' supplied from C & Pharm, cell viability was not decreased under conditions of culturing for 24 hr after treatment with a concentration of 100 μg/ml or less (10, 20, 50, and 100 μg/ml), compared to the negative control of 'JL-101 powder'. In the efficacy test for increasing the expression of collagen, the expression of COL1A1 mRNA was significantly increased upon treatment with 20, 50 and 100 g/ml of 'JL-101 powder' compared to the negative control. In particular, the expression of COL1A1 mRNA upon treatment with 100 μg/ml of 'JL-101 powder' was increased by 45.88±6.79% compared to the untreated negative control. Based on the results of treatment of human dermal fibroblasts with the positive control TGF-β at a concentration of 5.0 ng/ml, the expression of COL1A1 mRNA was increased by 219.65±7.25% compared to the negative control. The expression of COL3A1 mRNA was increased in a concentration-dependent manner upon treatment with 100 μg/ml or less of 'JL-101 powder'. In particular, the expression of COL3A1 mRNA upon treatment with 100 g/ml of 'JL-101 powder' was increased by 100.98±5.49% compared to the untreated negative control. Based on the results of treatment of human dermal fibroblasts with the positive control TGF-β at a concentration of 5.0 ng/ml, the expression of COL3A1 mRNA was increased by 22.93±6.21% compared to the negative control.

Therefore, when human dermal fibroblasts were treated with the test material supplied from C & Pharm, the expression of COL1A1 mRNA was increased by 45.88±6.79% and the expression of COL3A1 mRNA was increased by 100.98±5.49% compared to the negative control. Respective collagen expression levels were about 45.64% and 163.50% of the expression level of collagen by the positive control (TGF-β). Thereby, 'JL-101 powder' is determined to increase the expression of collagen in human dermal fibroblasts.

Reference Examples 1 and 2

Preparation of Reference Example 1

ⓐ EtOH 0.5:H$_2$O 9.5

3 g of ZnO and 148.3 ml of deionized water not containing carbonate ions ($CO_3^{2-}$) were stirred (400 rpm) at room temperature in a nitrogen atmosphere in a main tank, and a concentrated HCl solution was slowly added dropwise thereto so that the pH thereof was titrated to the range of 0.5 to 1. 2.6 g of vitamin C (ascorbic acid) was dissolved in 10 ml of deionized water and 8.69 ml of ethanol in an auxiliary tank 1, and the vitamin C solution of the auxiliary tank 1 was added to the main tank and stirred for 30 min in a nitrogen atmosphere. While the stirring rate (700 rpm) of the main tank was maintained, a 1.6 M sodium hydroxide aqueous solution of an auxiliary tank 2 was added thereto so that the pH thereof was titrated to the range of about 6.5 to 7.5, followed by induction of a precipitation reaction with stirring (700 rpm) for 3 hr. After reaction, the pH was measured to be 6.5 to 7.0, and after termination of the reaction, a white slurry precipitate was obtained. The precipitate was subjected to centrifugation and washing three times, thus removing unreacted salts and vitamin C. After centrifugation, the precipitate separated from the supernatant was cooled with liquid nitrogen and then lyophilized, thereby obtaining 3.5 g of a pale beige vitamin C-zinc hydroxide (yield: 58.1%, ascorbic acid content: 38.66%).

Preparation of Reference Example 2

ⓑ EtOH 9.5:H$_2$O 0.5

3 g of ZnO and 125.15 ml of ethanol not containing carbonate ions ($CO_3^{2-}$) were stirred (400 rpm) at room temperature in a nitrogen atmosphere in a main tank, and a concentrated HCl solution was slowly added dropwise thereto so that the pH thereof was titrated to the range of 0.5 to 1. 2.6 g of vitamin C was dissolved in 1.84 ml of deionized water and 40 ml of ethanol in an auxiliary tank 1, and the vitamin C solution of the auxiliary tank 1 was added to the main tank and stirred for 30 min in a nitrogen atmosphere. While the stirring rate (700 rpm) of the main tank was maintained, a 1.6 M sodium hydroxide aqueous solution of an auxiliary tank 2 was added thereto so that the pH thereof was titrated to the range of about 6.5 to 7.5, followed by induction of a precipitation reaction with stirring (700 rpm) for 3 hr. After reaction, the pH was measured to be 6.5 to 7.0, and after termination of the reaction, a white slurry precipitate was obtained. The precipitate was subjected to centrifugation and washing three times, thus removing unreacted salts and vitamin C. After centrifugation, the precipitate separated from the supernatant was cooled with liquid nitrogen and then lyophilized, thereby obtaining 3.41 g of a pale beige vitamin C-zinc hydroxide (yield: 56.6%, ascorbic acid content: 34.24%).

Figure 18:
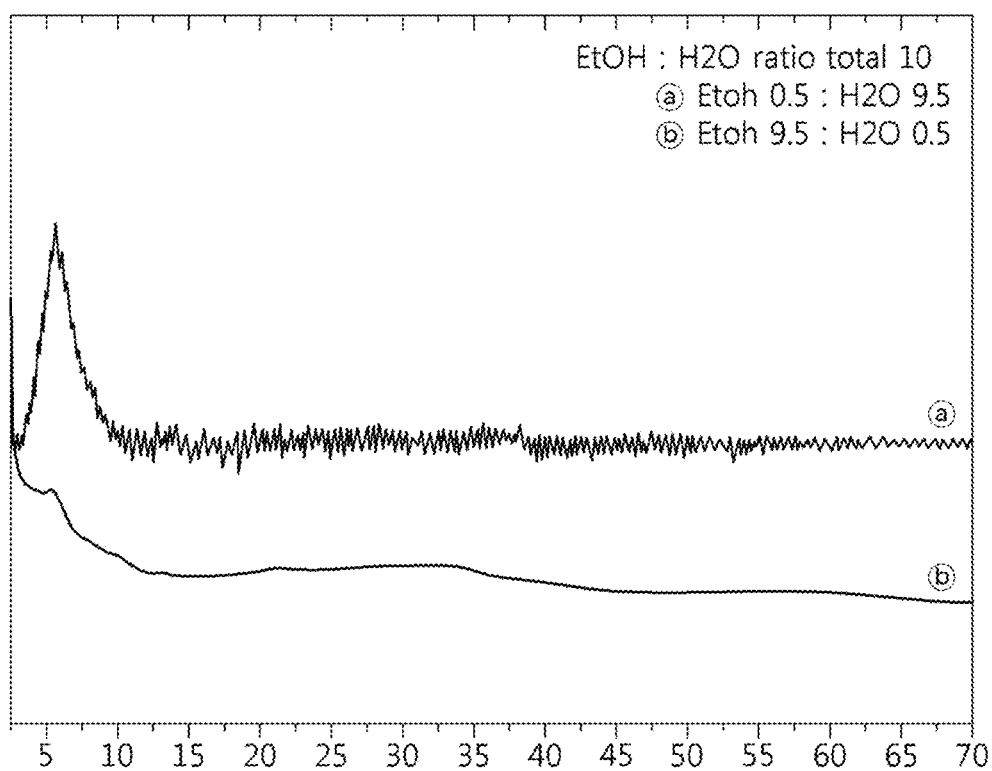
FIG. 18 is an XRD graph of metal hydroxide depending on the ratio of ethanol:water solvent.

Reference Examples 1 and 2 thus prepared are shown in Table 11 below, and the specific XRD values of Reference Examples 1 and 2 are shown in FIG. 18.

TABLE 11

| | material | MW | eq. | Reference Example 1 usage (g) | Reference Example 1 mole | Reference Example 2 usage (g) | Reference Example 2 mole |
|---|---|---|---|---|---|---|---|
| 1st | ZnO | 81.38 | standard | 3 | 0.036864 | 3 | 0.036864 |
| | HCl (conc. HCl) | 36.46 | 2.2 eq | 3 6.85 ml | 0.082282 | 3 6.85 ml | 0.082282 |
| | Solvent EtOH (ml) H2O | | | 0 148.3 | | 125.15 0 | |
| | Subtotal | | 24 v | 148.3 | | 125.15 | |
| 2nd | ascorbic acid | 176.16 | 0.4 eq | 2.6 | 0.014759 | 2.6 | 0.014759 |
| | solvent EtOH (ml) H2O | | | 8.69 10 | | 40 1.84 | |
| | subtotal | | 16.7 v | 18.69 | | 41.84 | |
| 3rd | 1.6N NaOH | | | 45 ml | | 45 ml | |
| Final result | Vitabrid C yield (g) yield (%) shape ascorbic acid (%) | 815.26 | 0.2 eq | 6.01 3.5 58.1 pale beige powder 38.66 | 0.007372 | 6.01 3.41 56.6 pale ivory Powder 34.24 | 0.07372 |
| | solvent (ml) | | EtOH H2O | 8.69 165.15 | | 165.15 8.69 | |
| | EtOH/H2O ratio | | EtOH H2O | 0.05 0.05 0..95 | | 19 0.95 0.05 | |
| | subtotal Solvent volume/ZnO ZnO % in solvent | | | 173.84 55.7 1.80 | | 173.84 55.7 1.80 | |

INDUSTRIAL APPLICABILITY

According to the present invention, a metal hydroxide complex is configured such that an active ingredient is included in a modified multilayer hydroxide structure, thereby exhibiting superior sustained release performance and improving the effect of the active ingredient that is delivered due to the stable inclusion of a high content of the active ingredient in the metal hydroxide complex. Moreover, the complex stably includes the unstable active ingredient, thereby enabling long-term storage of the active ingredient, and, when delivered to the skin, it is possible to minimize irritation, thereby providing a non-irritating effect, and can exhibit an excellent collagen expression effect.

In addition, the present invention provides a method of manufacturing the metal hydroxide complex having superior effects as described above.

The invention claimed is:

1. A metal hydroxide complex comprising:
a multilayer hydroxide structure of Chemical Formula I below, comprising a base layer, a surface layer and an active ingredient:

$$\{[M_x(OH)_z]^B[M_y(OH)_w]^S\}\{(A^n)_q\}\cdot m(H_2O) \quad \text{[Chemical Formula 1]}$$

wherein $[M_x(OH)_z]^B$ represents the base layer of the multilayer hydroxide structure, and $[M_y(OH)_w]^S$ represents the surface layer of the multilayer hydroxide structure,
M is any one divalent metal cation selected from the group consisting of $Zn^{2+}$,
x is 0.6 to 3,
y is more than 0 and up to 2,
z is 1 to 5,
w is more than 0 and up to 4,
z+w is 1 to 9,
q is 1 to 4,
m is 0.1 to 10,
n is a charge number of A, and
the active ingredient is represented by A, in which A is an anionic compound comprising ascorbic acid,
wherein the multilayer hydroxide structure has a powder-X-ray diffraction pattern having peak values of diffraction angles (2θ) of 5.96±1°, 33.46±1 and 59.3±1°.

2. The metal hydroxide complex of claim 1, wherein the multilayer hydroxide structure comprises two to five layers.

3. A metal hydroxide complex comprising:
a multilayer hydroxide structure of Chemical Formula I below, comprising a base layer, a surface layer and an active ingredient:

$$\{[M_x(OH)_z]^B[M_y(OH)_w]^S\}\{(A^n)_q\}\cdot m(H_2O) \quad \text{[Chemical Formula 1]}$$

wherein $[M_x(OH)_z]^B$ represents the base layer of the multilayer hydroxide structure, and $[M_y(OH)_w]^S$ represents the surface layer of the multilayer hydroxide structure,
M is any one divalent metal cation selected from the group consisting of $Zn^{2+}$,
x is 0.6 to 3,
y is more than 0 and up to 2,
z is 1 to 5,
w is more than 0 and up to 4,
z+w is 1 to 9,
q is 1 to 4,
m is 0.1 to 10,
n is a charge number of A, and
the active ingredient is represented by A, in which A is an anionic compound comprising ascorbic acid,
wherein the multilayer hydroxide structure has a powder-X-ray diffraction pattern having peak values of diffraction angles (2θ) of 5.96±1°, 8.5±1, 10.36±1, 13.36±1°, 19±1, 20.84±1, 21.7±1, 26.34±1, 37.68±1, 31.48±1, 33.78±1, 34.88±1 and 59.3±1.

4. A metal hydroxide complex comprising:
a multilayer hydroxide structure of Chemical Formula I below, comprising a base layer, a surface layer and an active ingredient:

$$\{[M_x(OH)_z]^B[M_y(OH)_w]^S\}\{(A^n)_q\}\cdot m(H_2O) \quad \text{[Chemical Formula 1]}$$

wherein $[M_x(OH)_z]^B$ represents the base layer of the multilayer hydroxide structure, and $[M_y(OH)_w]^S$ represents the surface layer of the multilayer hydroxide structure,
M is any one divalent metal cation selected from the group consisting of $Zn^{2+}$,
x is 0.6 to 3,
y is more than 0 and up to 2,
z is 1 to 5,
w is more than 0 and up to 4,
z+w is 1 to 9,
q is 1 to 4,
m is 0.1 to 10,
n is a charge number of A, and
the active ingredient is represented by A, in which A is an anionic compound comprising ascorbic acid, wherein the multilayer hydroxide structure has a powder-X-ray diffraction pattern having peak values of diffraction angles (2θ) of 6.28±1°, 8.88±1°, 10.32±1, 13.42±1, 21.04±1, 28.14±1, 33.5±1 and 59.16±1°.

5. The metal hydroxide complex of claim 1, wherein the multilayer hydroxide structure is manufactured through coprecipitation by a precipitation reaction using an alcohol and water as a solvent.

6. The metal hydroxide complex of claim 5, wherein the alcohol is at least one selected from the group consisting of methanol, ethanol propanol and butanol.

7. The metal hydroxide complex of claim 1, wherein the metal hydroxide complex is manufactured by subjecting an active ingredient and a metal hydroxide structure precursor to coprecipitation through a precipitation reaction using an alcohol and water.

8. The metal hydroxide complex of claim 7, wherein the alcohol is at least one selected from the group consisting of methanol, ethanol, propanol and butanol.

9. The metal hydroxide complex of claim 7, wherein a ratio of alcohol and water in the coprecipitation is 1:9 to 9:1.

10. A method of manufacturing the metal hydroxide complex of claim 1 comprising subjecting an active ingredient and a metal hydroxide structure precursor to coprecipitation through a precipitation reaction using an alcohol and water.

11. The method of claim 10, wherein the alcohol is at least one selected from the group consisting of methanol, ethanol, propanol and butanol.

12. The metal hydroxide complex of claim 3, wherein the multilayer hydroxide structure comprises two to five layers.

13. The metal hydroxide complex of claim 4, wherein the multilayer hydroxide structure comprises two to five layers.

* * * * *